United States Patent
Matsui et al.

(10) Patent No.: US 8,934,351 B2
(45) Date of Patent: Jan. 13, 2015

(54) COMMUNICATION APPARATUS AND COMMUNICATION SYSTEM

(75) Inventors: Takashi Matsui, Kobe (JP); Shinichiroh Takatomi, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 93 days.

(21) Appl. No.: 13/420,196

(22) Filed: Mar. 14, 2012

(65) Prior Publication Data

US 2012/0243426 A1    Sep. 27, 2012

(30) Foreign Application Priority Data

Mar. 24, 2011  (JP) ................ 2011-065651
Mar. 24, 2011  (JP) ................ 2011-065653
Mar. 24, 2011  (JP) ................ 2011-065654

(51) Int. Cl.
| | |
|---|---|
| *H04L 12/26* | (2006.01) |
| *G06F 11/00* | (2006.01) |
| *H04L 1/00* | (2006.01) |
| *H04L 12/28* | (2006.01) |
| *H04J 1/16* | (2006.01) |
| *H04J 3/14* | (2006.01) |

(Continued)

(52) U.S. Cl.
CPC .......... *H04L 43/0847* (2013.01); *H04L 1/1887* (2013.01); *H04L 43/16* (2013.01)
USPC ........... 370/242; 370/235; 370/236; 370/252; 370/349; 370/412; 370/421; 701/8; 701/22; 701/51; 701/29.7; 701/30.1; 714/748; 714/749

(58) Field of Classification Search
CPC .... H04L 43/0847; H04L 43/16; H04L 1/1858
USPC ................. 370/236, 242, 252, 257, 349, 475; 701/8, 22, 36, 51, 29.7, 30.1, 31.5; 710/110, 111, 117; 714/748–751
See application file for complete search history.

(56) References Cited

U.S. PATENT DOCUMENTS 7,539,174 B2 *  5/2009  Hosaka et al. ................ 370/349
2002/0183026 A1  12/2002  Naruse
(Continued)

FOREIGN PATENT DOCUMENTS

| | | |
|---|---|---|
| JP | A-6-252895 | 9/1994 |
| JP | A-8-33070 | 2/1996 |

(Continued)

OTHER PUBLICATIONS

Aug. 26, 2014 Notice of Rejection issued in Japanese Patent Application No. 2011-065653 (with English-language translation).

(Continued)

*Primary Examiner* — Un C Cho
*Assistant Examiner* — Peian Lou
(74) *Attorney, Agent, or Firm* — Oliff PLC

(57) ABSTRACT

A hybrid vehicle electronic control unit (HV-ECU) includes a communication unit and a retransmission control unit. The communication unit performs a retransmitting process of data when a transmission error of the data is detected. The retransmission control unit inhibits the retransmitting process in a corresponding communication period and releases the retransmitting process when the corresponding communication period ends and the next communication period starts if the number of times that a transmission error is detected in a predetermined communication period is larger than a transmission stop determination threshold value.

15 Claims, 20 Drawing Sheets

(51) Int. Cl.
  *H04J 3/24* (2006.01)
  *G06F 7/00* (2006.01)
  *G06F 17/00* (2006.01)
  *H04L 1/18* (2006.01)
  *G08C 25/02* (2006.01)

(56) References Cited

U.S. PATENT DOCUMENTS

2005/0254463 A1* 11/2005 Suzuki et al. ................. 370/335
2010/0087976 A1*  4/2010 Aridome et al. ............... 701/22
2010/0150176 A1*  6/2010 Yakashiro ..................... 370/475
2011/0320079 A1  12/2011 Yasuda

FOREIGN PATENT DOCUMENTS

| | | |
|---|---|---|
| JP | A-9-162814 | 6/1997 |
| JP | A-9-224030 | 8/1997 |
| JP | A-2001-203728 | 7/2001 |
| JP | A-2005-31993 | 2/2005 |
| JP | A-2007-300331 | 11/2007 |
| JP | A-2010-147590 | 7/2010 |
| JP | A-2011-030151 | 2/2011 |
| WO | WO 02/32083 A1 | 4/2002 |
| WO | WO 2008/078585 A1 | 7/2008 |
| WO | WO 2010/073312 A1 | 7/2010 |

OTHER PUBLICATIONS

Aug. 26, 2014 Notice of Rejection issued in Japanese Patent Application No. 2011-065654 (with English-language translation).

Oct. 21, 2014 Office Action issued in Japanese Application No. 2011-065651 (with English-language translation).

* cited by examiner

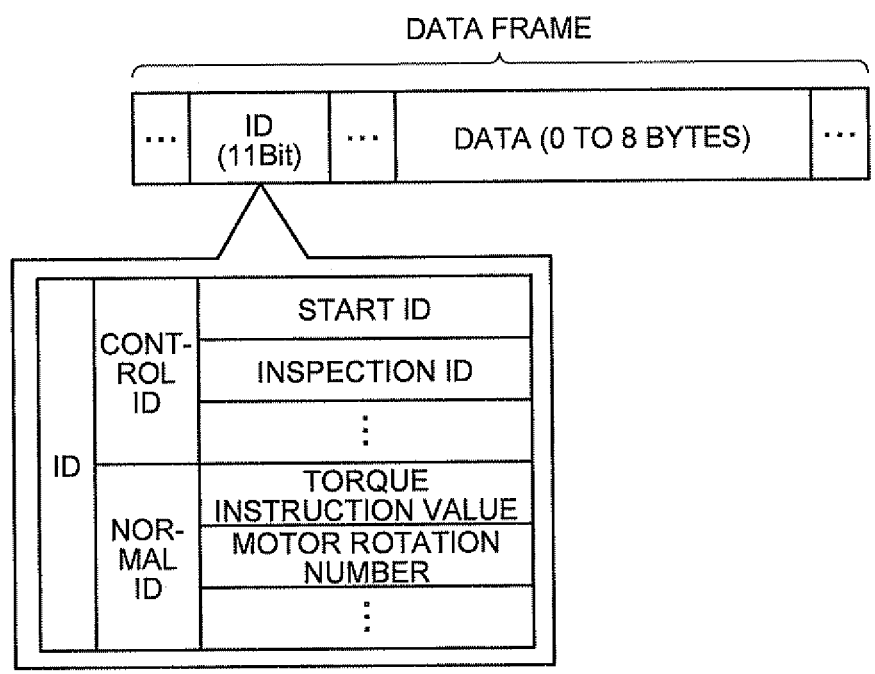

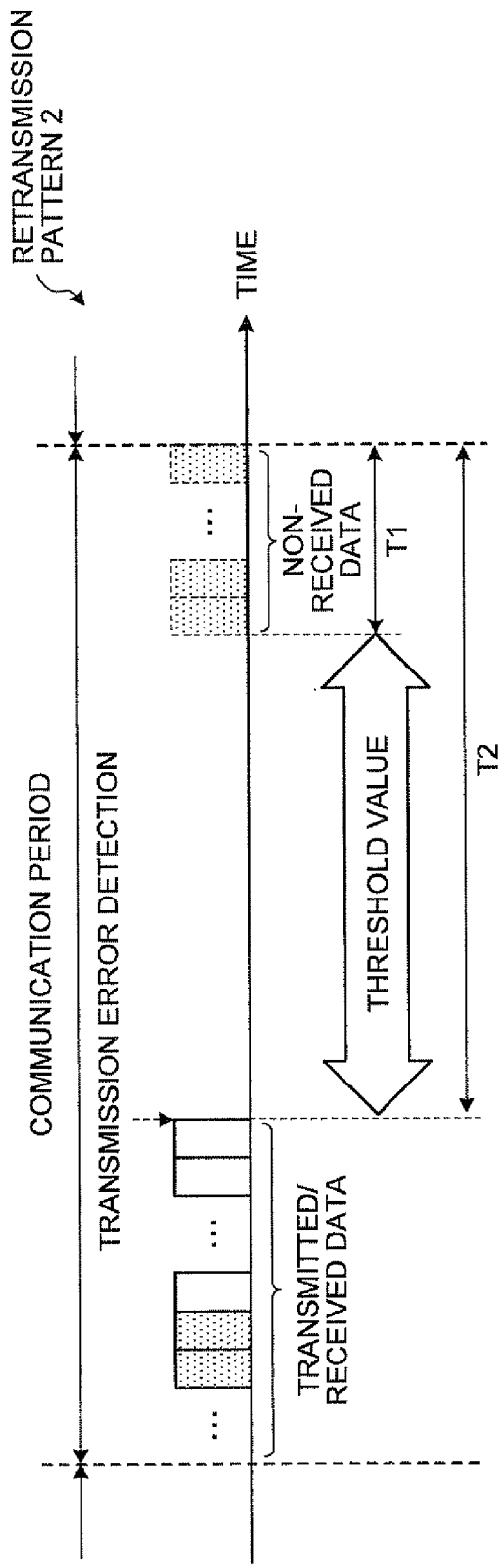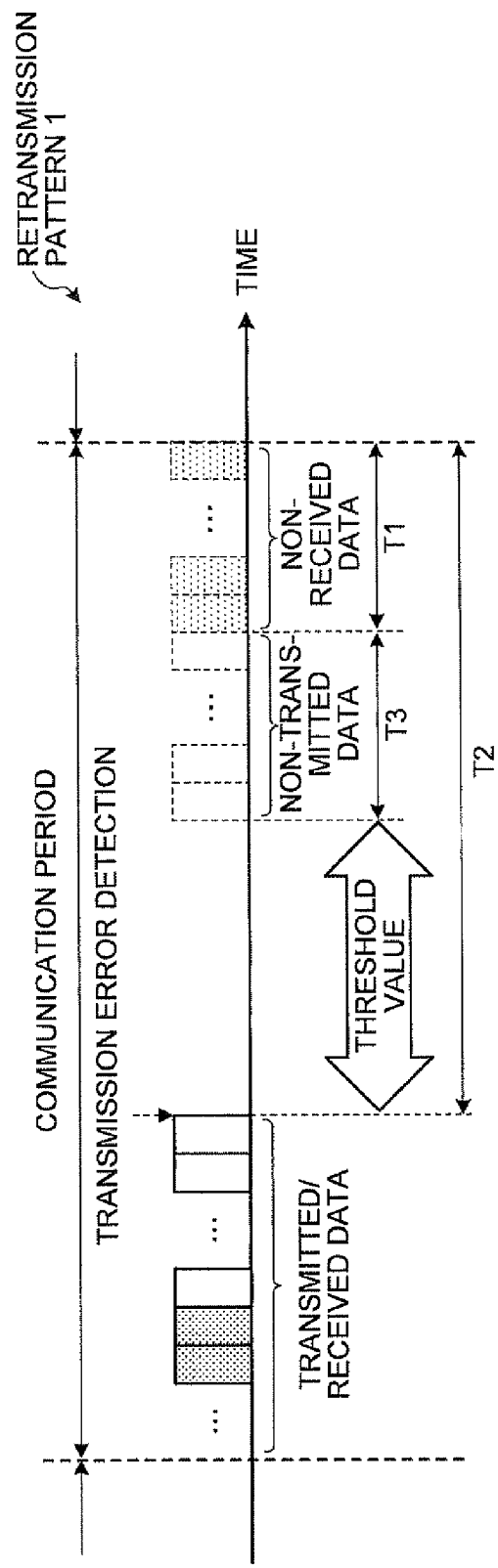

FIG.13

| DATA FRAME HAVING TRANSMISSION ERROR | TRANSMISSION STOP DETERMINATION THRESHOLD VALUE TO BE APPLIED | THRESHOLD VALUE DECIDING METHOD |
|---|---|---|
| DATA FRAME INCLUDING START ID | TRANSMISSION STOP DETERMINATION THRESHOLD VALUE A | T2-T1 |
| OTHER DATA FRAME | TRANSMISSION STOP DETERMINATION THRESHOLD VALUE B | $\alpha$(T2-T1) |

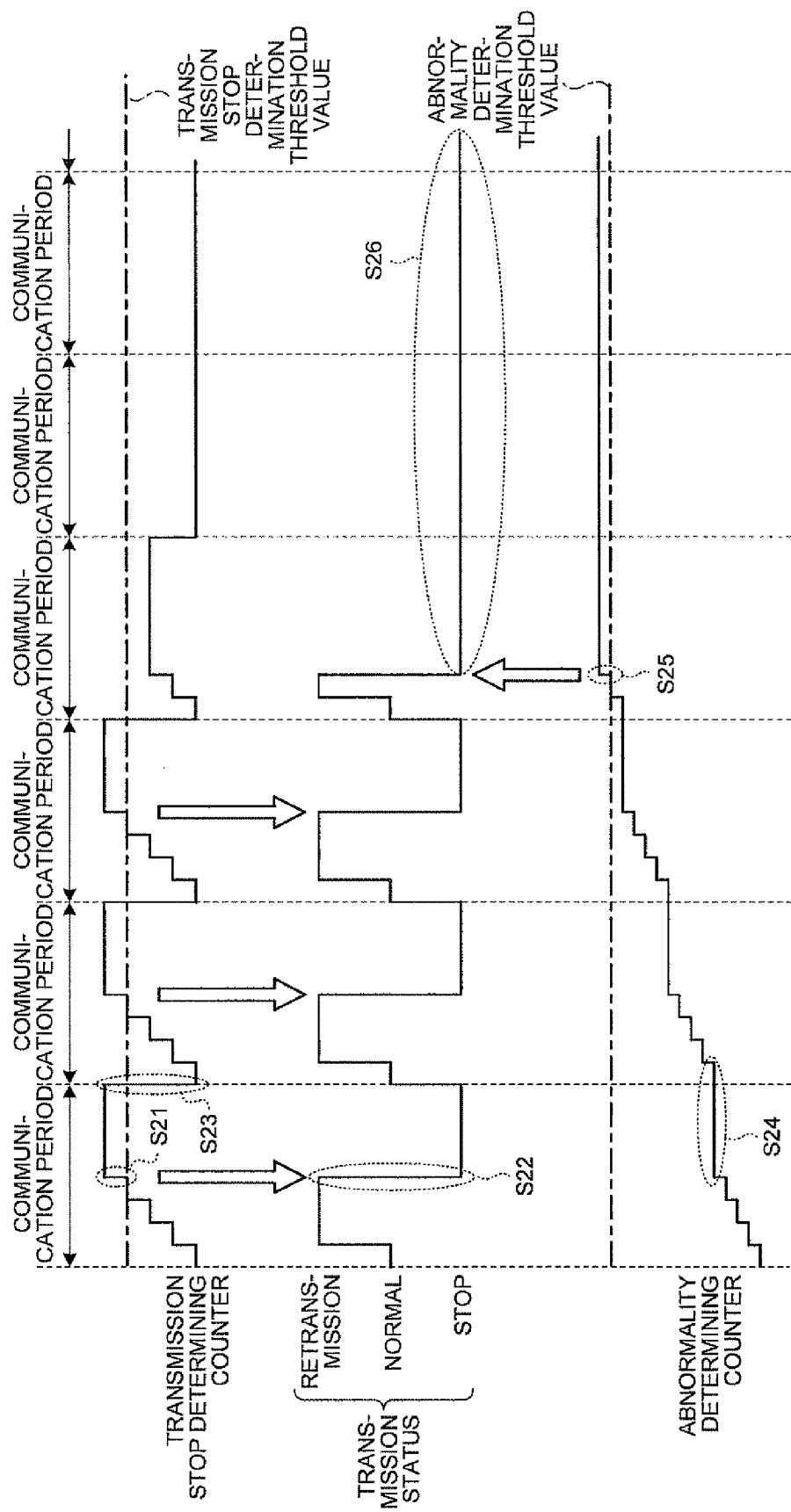

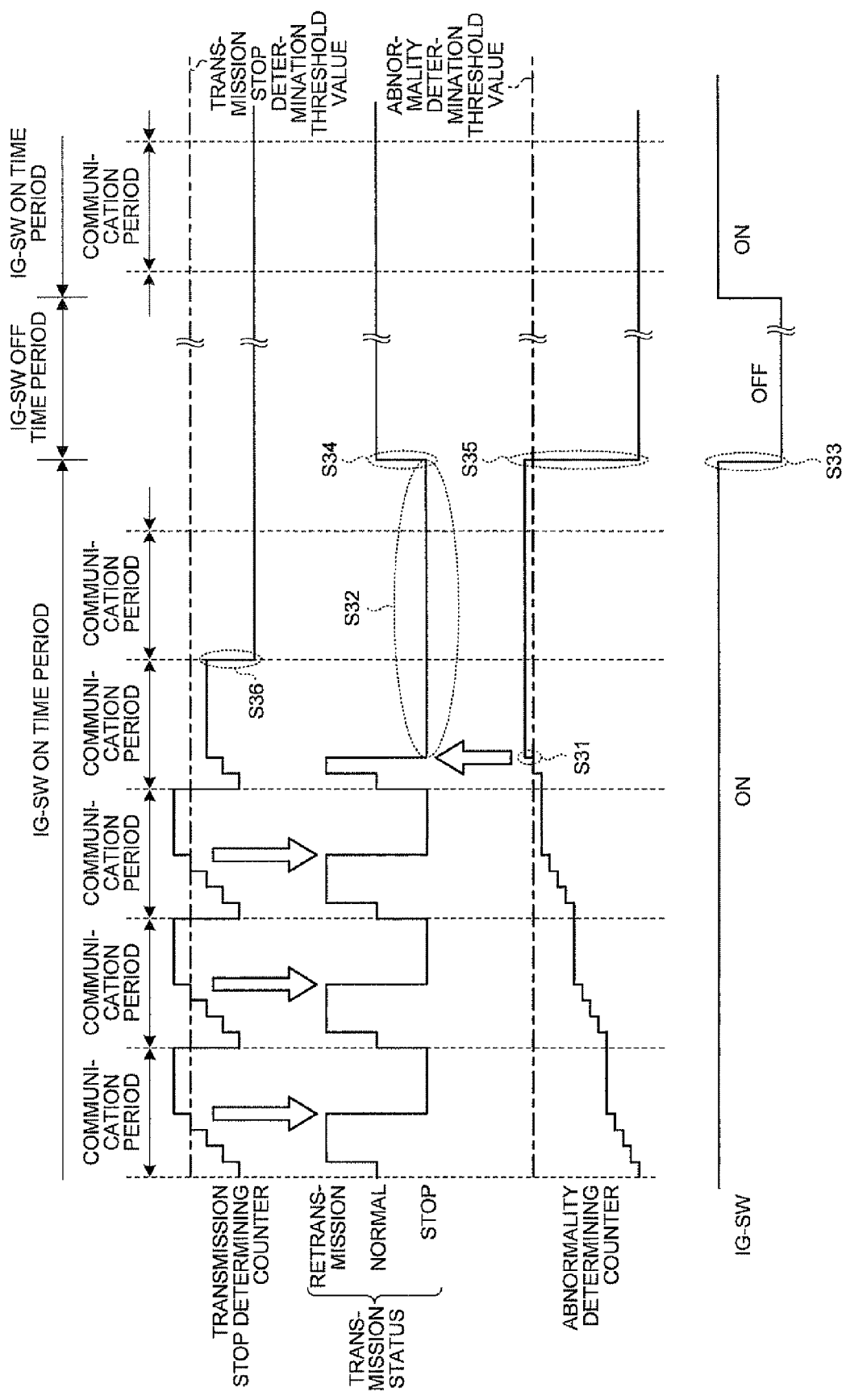

FIG.17

| COUNTING PATTERN OF ABNORMALITY DETERMINING COUNTER | | |
|---|---|---|
| COUNT-UP CONDITION | COUNT-DOWN CONDITION | |
| EACH TIME WHEN TRANSMISSION ERROR IS DETECTED | NONE | PATTERN 1 |
| | EACH TIME WHEN TRANSMISSION OF FRAME DATA IS NORMALLY COMPLETED | PATTERN 2 |
| IN EACH COMMUNICATION PERIOD IN WHICH TRANSMISSION ERROR IS DETECTED | NONE | PATTERN 3 |
| | WHEN TRANSMISSION ERROR IS NOT DETECTED WITHIN COMMUNICATION PERIOD | PATTERN 4 |
| WHEN TRANSMISSION ERROR HAS BEEN DETECTED BUT ERROR HAS | NONE | PATTERN 5 |
| | WHEN TRANSMISSION ERROR IS NOT DETECTED WITHIN COMMUNICATION PERIOD OR WHEN TRANSMISSION ERROR HAS BEEN DETECTED BUT ERROR HAS NOT BEEN FIXED WITHIN CONTROL PERIOD | PATTERN 6 |

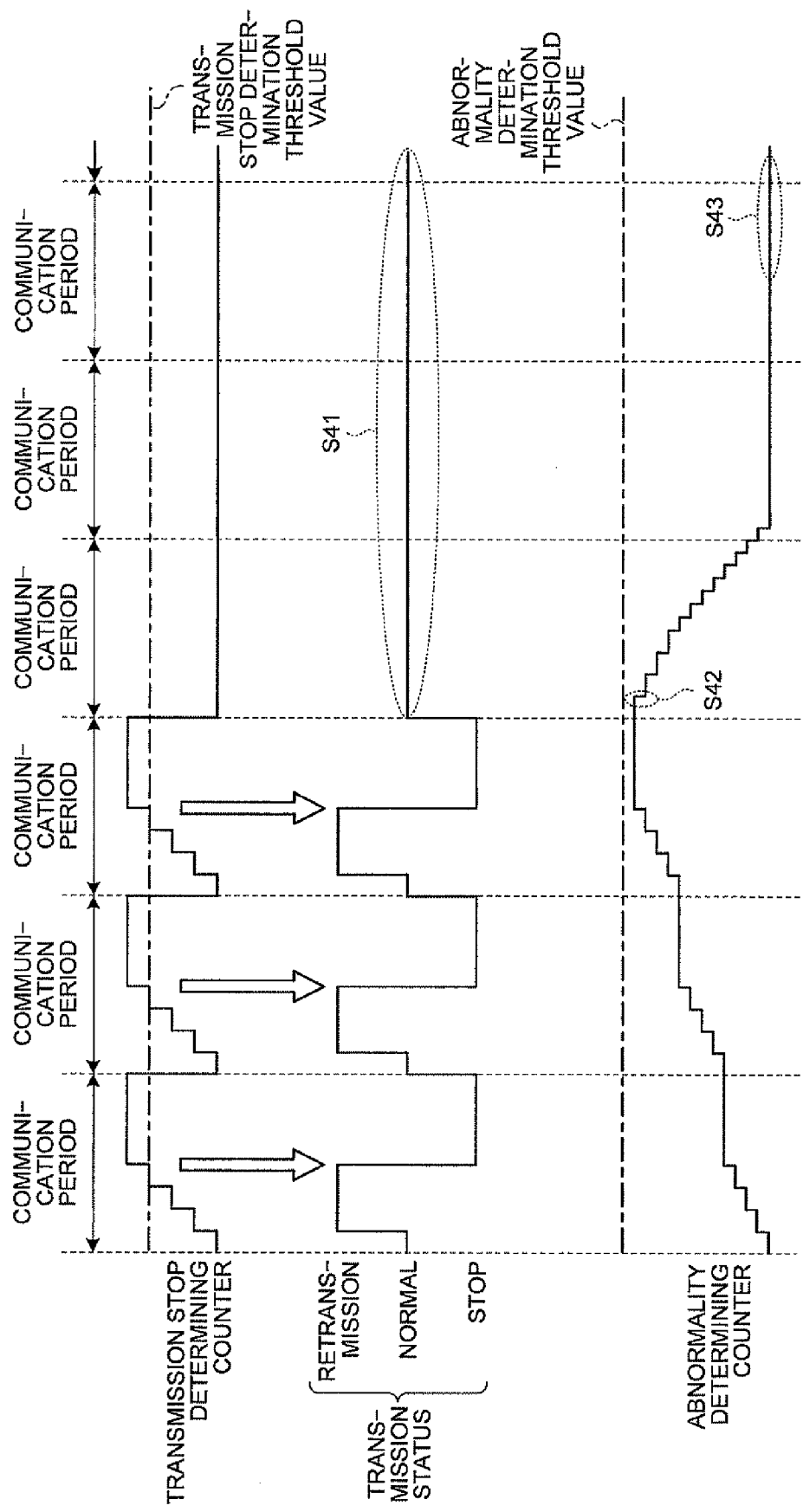

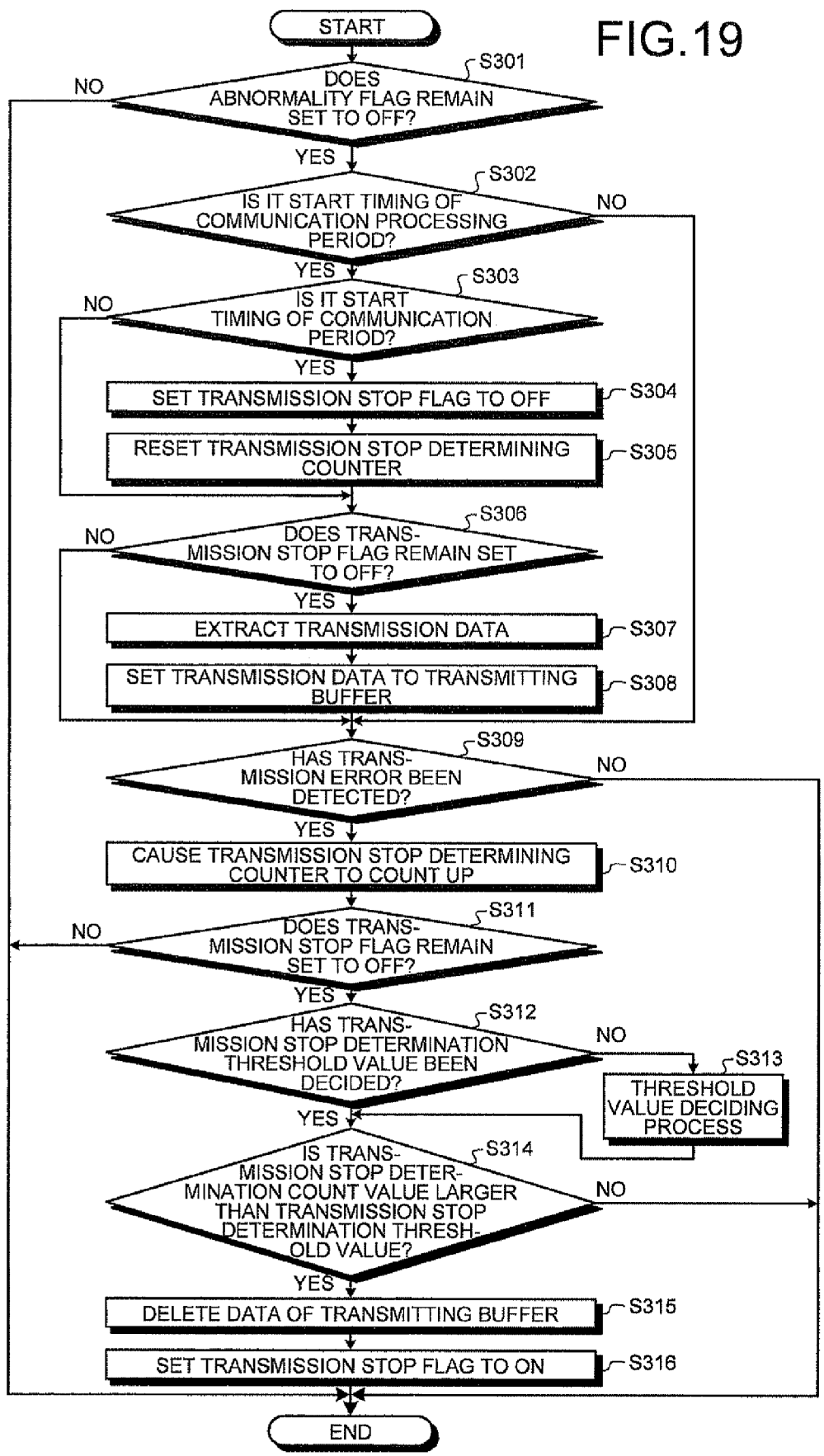

COMMUNICATION APPARATUS AND COMMUNICATION SYSTEM

CROSS-REFERENCE TO RELATED APPLICATIONS

This application is based upon and claims the benefit of priority of the prior Japanese Patent Application No. 2011-065651, filed on Mar. 24, 2011; Japanese Patent Application No. 2011-065653, filed on Mar. 24, 2011; Japanese Patent Application No. 2011-065654, filed on Mar. 24, 2011, the entire contents of both of which are incorporated herein by reference.

BACKGROUND OF THE INVENTION

1. Field of the Invention

The present invention relates to a communication apparatus and a communication system.

2. Description of the Related Art

Conventionally, CAN (controller area network) communication has been known as a communication protocol between ECUs (electronic control units) such as an engine ECU and a motor ECU. In the CAN communication, various data transmitted or received between ECUs is transmitted using a communication line called a CAN bus. Such CAN communication is being widely used as a communication protocol which is low in cost and high in degree of freedom.

In the CAN communication, a master-slave relation is not decided, and instead a so-called multi-master system in which each ECU transmits data at an arbitrary timing is being employed. In case where the multi-master system is employed, data is simultaneously transmitted from a plurality of ECUs to a CAN bus, but a plurality of data is not present on one CAN bus at the same time. For this reason, in the CAN communication, in order to avoid a communication collision, communication mediation for giving a priority order to each data is performed, and then data transmission is performed in descending order of the priority order.

Further, in the CAN communication, when a transmission error of data occurs, a retransmitting process for retransmitting such data is performed. In recent years, a technique of stopping the retransmitting process when the retransmitting process is repeated during a predetermined time has been known. For example, in a technique disclosed in Japanese Patent Application Laid-Open No. 2010-147590, the retransmitting process is repeated until a transmission error is continued during a predetermined time. Then, when the predetermined time elapses, the transmission error is determined as a persistent error caused by a breakdown of an ECU or the like, and thus transmission of all data including retransmission data is stopped.

However, in the above described conventional technique, when ECUs repeat transmission and reception of data with a predetermined communication period, a situation in which data that has to be received within the communication period is not received within the communication period may occur if the retransmitting process is repeated.

Particularly, when data having a transmission error is high in a priority order, data having a priority order lower than the data is not transmitted while retransmission of the data is repeated. Thus, there is a high possibility that a situation in which data having a low priority order is not transmitted within the communication period will occur.

One aspect of an embodiment is aimed to provide a communication apparatus and communication system that can prevent a loss of data that has to be received in a predetermined communication period even when a transmission error occurs.

SUMMARY OF THE INVENTION

A communication apparatus according to an embodiment is in a communication system in which a plurality of communication apparatuses perform transmission and reception of data with a predetermined communication period repeated at predetermined time intervals. Communication in the communication system is performed by a communication scheme in which simultaneous transmission from a plurality of devices is not allowed. The communication apparatus comprise a retransmitting means, a retransmission control means. A retransmitting means performs a retransmitting process of data when a transmission error of the data is detected. A retransmission control means inhibits the retransmitting process in a corresponding communication period and releases the retransmitting process when the corresponding communication period ends and the next communication period starts if the number of times of detection or a duration time of a transmission error detected within one period of the communication period is larger than a first threshold value.

According to a communication apparatus disclosed in this disclosure, loss of data that has to be received in a predetermined communication period can be prevented even when a transmission error occurs.

BRIEF DESCRIPTION OF THE DRAWINGS

The understanding of the present invention and the advantages obtained from the understanding will be apparent with ease, referring to the description of an exemplary detailed embodiment of the invention and the accompanying drawings:

FIG. 4 is a diagram illustrating an example of a frame format of frame data;

FIG. 5 is a diagram illustrating an example of a correspondence relation between data to be transmitted within a communication period and a start ID;

FIGS. 9A and 9B are diagrams illustrating examples of a threshold value deciding process;

FIG. 13 is a diagram illustrating an example of a retransmission control process according to a second embodiment;

FIG. 15 is a diagram illustrating an operation example of a retransmission control unit and an abnormality detecting unit (1 thereof);

FIG. 16 is a diagram illustrating an operation example of a retransmission control unit and an abnormality detecting unit (2 thereof);

FIG. 17 is a diagram illustrating an example of a count pattern of an abnormality determining counter;

FIG. 18 is a diagram illustrating an operation example of a retransmission control unit and an abnormality detecting unit (3 thereof).

FIG. 19 is a flowchart illustrating a processing procedure of a transmitting process according to the third embodiment;

DETAILED DESCRIPTION OF THE PREFERRED EMBODIMENTS

Figure 1:
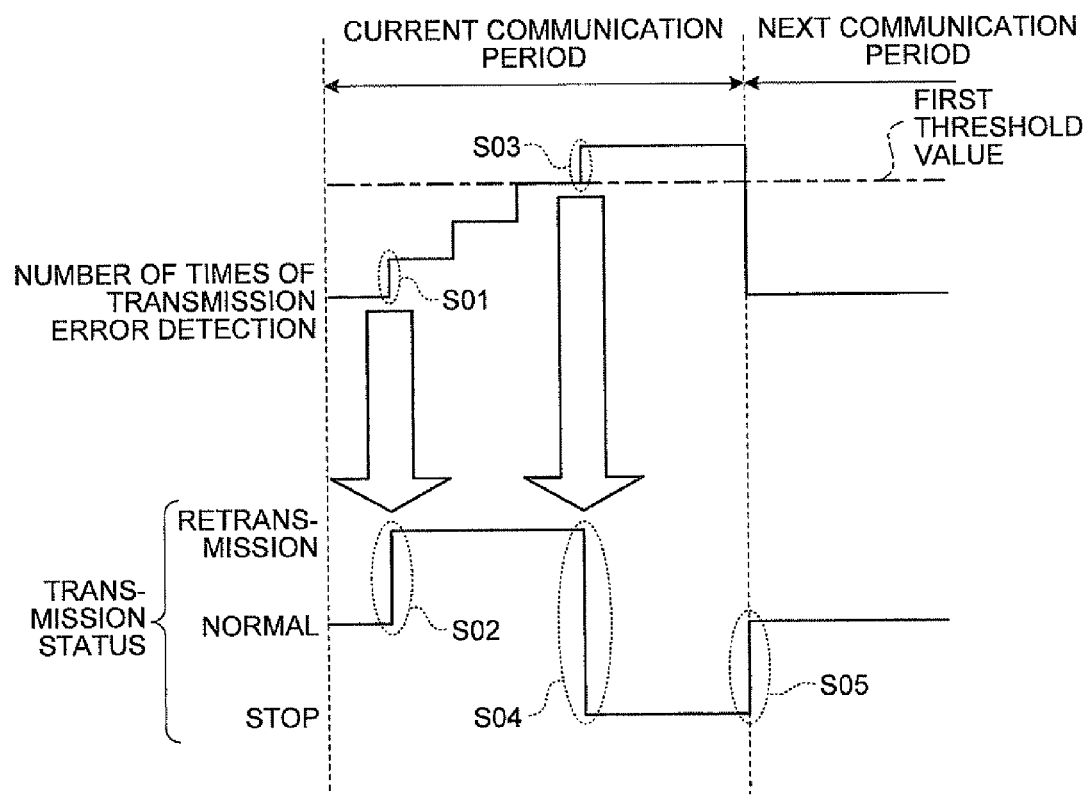
FIG. 1 is an explanatory diagram of a communication method according to the present disclosure.

Hereinafter, embodiments of a communication apparatus and a communication system according to the present disclosure will be described in detail with the accompanying drawings. First, a communication method according to the present disclosure will be described with reference to FIG. 1. FIG. 1 is an explanatory diagram of the communication method according to the present disclosure.

In the conventional communication method, when a first communication apparatus and a second communication apparatus perform transmission and reception of data with a predetermined communication period, if a transmission error occurs, a retransmitting process is repeated. In this case, data that has to be received within the communication period may not be received within the communication period.

Particularly, when data having a transmission error is high in a priority order, data having a priority order lower than the data is not transmitted while retransmission of the data is repeated.

For example, in a communication method in which simultaneous transmission from a plurality of devices is not allowed like the CAN communication, when data having a high priority order is transmitted and a transmission error occurs, it is difficult for a communication apparatus to transmit data having a priority order lower than the data having the transmission error. Further, it is also difficult to another communication apparatus connected to the same communication bus to transmit data having a priority order lower than the data having the transmission error since a communication bus has been already occupied. For this reason, there is a high possibility that a situation in which data having a low priority order is not transmitted within a communication period will occur.

In this regard, in a communication method according to the present disclosure, when the number of times that a transmission error is detected within one cycle in a predetermined communication period which is repeated at predetermined time intervals is larger than a first threshold value, a retransmitting process is inhibited in the communication period. Then, when the communication period ends and then the next communication period starts, inhibition of the retransmitting process is released.

As illustrated in FIG. 1, in the communication method according to the present disclosure, when a transmission error of data is detected (see step S01 of FIG. 1), a retransmitting process of the data is performed (see step S02 of FIG. 1). Further, in the communication method according to the present disclosure, when the number of times that a transmission error is detected in a current communication period is larger than a first threshold value (see step S03 of FIG. 1), the retransmitting process is inhibited (see step S04 of FIG. 1).

Further, in the communication method according to the present disclosure, for example, when the next communication period starts, an inhibition state of the retransmitting process is released (see step S05 of FIG. 1). Thus, the inhibition state of the retransmitting process is applied only in the current communication period.

As described above, in the communication method according to the present disclosure, when a transmission error of data is detected, the retransmitting process of the data is performed. Then, when the number of times that the transmission error is detected within one cycle in a predetermined communication period is larger than the first threshold value, the retransmitting process is inhibited in the communication period. Then, when the communication period ends and then the next communication period starts, inhibition of the retransmitting process is released.

That is, in the communication method according to the present disclosure, when the number of times that a transmission error is detected within one cycle is larger than the first threshold value, it is determined that a problem is likely to occur during transmission of another data, and thus the retransmitting process is inhibited. As a result, it is possible to prevent data reception from being disturbed due to a repetition of the retransmitting process.

Here, this determination is made not to determine a persistent error caused by a malfunction of a communication apparatus but to prevent loss of reception data. Thus, the retransmitting process is released in the next communication period.

Thus, according to the communication method of the present disclosure, even when a transmission error occurs, loss of data that has to be received in a predetermined communication period can be prevented.

FIG. 1 illustrates the example of inhibiting the retransmitting process when the number of times that a transmission error is detected is larger than the first threshold value. However, the present invention is not limited thereto, and the retransmitting process may be inhibited when a duration time of a transmission error is larger than a first threshold value.

Further, in the communication method according to the present disclosure, the first threshold value may be dynamically changed according to a timing, in a communication period, at which a transmission error is detected. For example, the first threshold value may be decided based on a remaining time of a communication period and a time necessary until all remaining data is received. This point will be described later.

In the following, embodiments of a communication apparatus and a communication system to which the communication method according to the present disclosure is applied will be described in detail. Further, in the following embodiments, a communication system between in-vehicle ECUs is described as an example of a communication system. However, the present invention is not limited thereto, and the communication method according to the present disclosure can be applied even to a communication system between different communication apparatuses.

In the following, a HV (hybrid vehicle)-ECU that controls power train system ECUs is described as an example of a first communication apparatus, and a motor ECU which is one of power train system ECUs is described as an example of a second communication apparatus.

Figure 2:
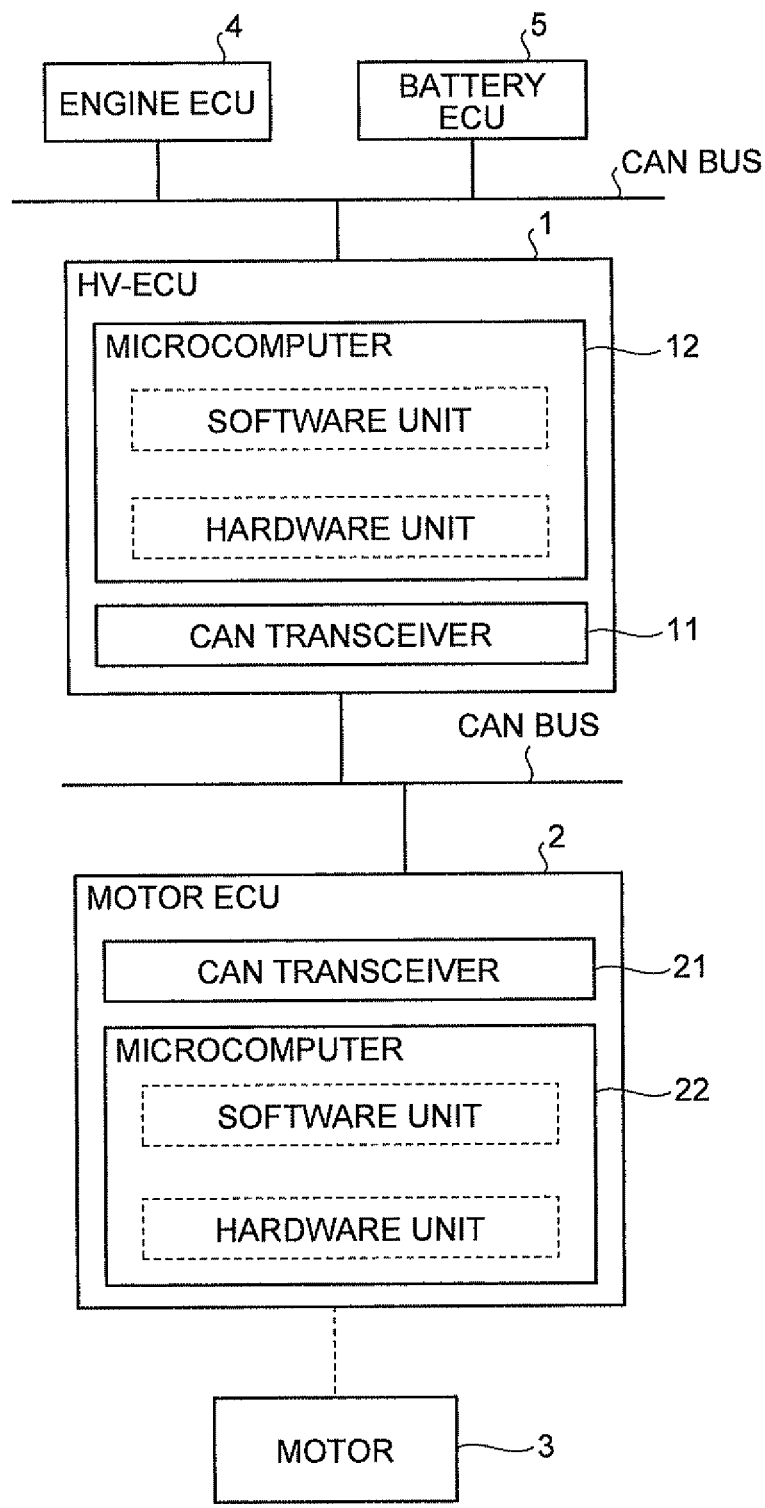
FIG. 2 is a diagram illustrating a configuration example of a communication system according to a first embodiment.

First, a configuration example of a communication system according to a first embodiment will be described with reference to FIG. 2. FIG. 2 is a diagram illustrating a configuration example of the communication system according to the first embodiment.

As illustrated in FIG. 2, in the communication system according to the present embodiment, a HV-ECU 1 is connected with a motor ECU 2 via a CAN bus. The CAN bus is a two-wire communication line including a CAN_Hi line and CAN_Lo line. The motor ECU 2 is connected with a motor 3.

In this communication system, the HV-ECU 1 which is a master node performs overall control of the motor 3, an engine, and the like in cooperation with a variety of ECUs installed in a vehicle such as the motor ECU 2, and the motor ECU 2 which is the slave node performs concrete control of the motor 3 in response to a command from the HV-ECU 1.

For example, the HV-ECU 1 transmits a torque instruction value of the motor 3 to the motor ECU 2 via the CAN bus. The motor ECU 2 receives the torque instruction value from the HV-ECU 1 via the CAN bus, and then controls the motor 3 based on the received torque instruction value. The motor ECU 2 transmits the control result on the motor 3 to the HV-ECU 1. Such a series of processes is performed with a predetermined communication period which is previously decided.

As described above, the communication apparatus of the present disclosure is provided for a control device that needs to receive a predetermined amount of data within one communication period as data used for a predetermined calculation process performed with a predetermined control period.

Here, a "control period" refers to not only a processing period of a predetermined control process performed by the first communication apparatus but also a time period which is necessary for a predetermined control process and is necessary to complete communication processing performed between the first communication apparatus and the second communication apparatus. A "communication processing period" refers to a processing period of processing performed for communication within a communication period. In the following, an example in which the control period is identical to the communication period is described, but the control period may be different from the communication period in the length of a period or start timing.

The HV-ECU 1 includes a CAN transceiver 11 and a microcomputer 12. Similarly, the motor ECU 2 includes a CAN transceiver 21 and a microcomputer 22. Here, hardware for the CAN communication is used as hardware units of the CAN transceivers 11 and 21 and the microcomputers 12 and 22 and hardware such as the CAN bus "as is." That is, the communication system according to the present embodiment can be implemented using an inexpensive configuration, similarly to the CAN communication.

Further, as illustrated in FIG. 2, the HV-ECU 1 is connected with a bus (for example, a CAN bus) for a connection with a variety of ECUs installed in a vehicle such as an engine ECU 4 or a battery ECU 5 as well as the CAN bus for a connection with the motor ECU 2.

Further, as illustrated in FIG. 2, the HV-ECU 1 and the motor ECU 2 are connected to the CAN bus for a connection between the HV-ECU 1 and the motor ECU 2, but three or more communication apparatuses (ECUs) may be connected to the CAN bus.

Figure 3:
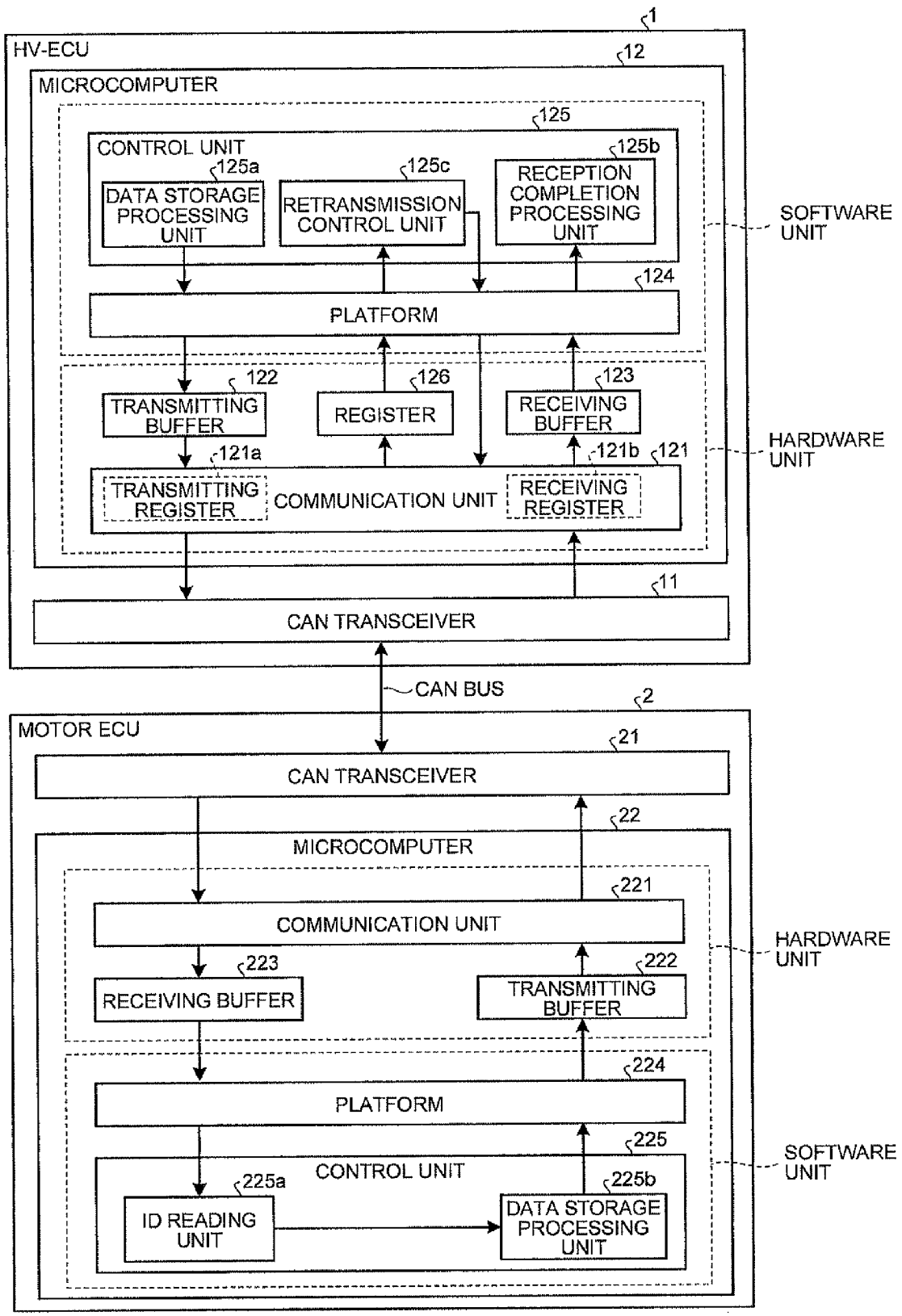
FIG. 3 is a block diagram illustrating configurations of a HV-ECU and a motor ECU.

Next, configurations of the HV-ECU 1 and the motor ECU 2 will be described with reference to FIG. 3. In FIG. 3, only components necessary for describing features of the HV-ECU 1 and the motor ECU 2 are illustrated, and general components are not illustrated.

As illustrated in FIG. 3, the HV-ECU 1 includes the CAN transceiver 11 and the microcomputer 12. The microcomputer 12 includes a communication unit 121, a transmitting buffer 122, a receiving buffer 123, a register 126, a platform 124, and a control unit 125. The control unit 125 includes a data storage processing unit 125a, a reception completion processing unit 125b, and a retransmission control unit 125c.

The motor ECU 2 includes the CAN transceiver 21 and the microcomputer 22. The microcomputer 22 includes a communication unit 221, a transmitting buffer 222, a receiving buffer 223, a platform 224, and a control unit 225. The control unit 225 includes an ID reading unit 225a and a data storage processing unit 225b.

First, a configuration of the HV-ECU 1 will be described. The CAN transceiver 11 is an IC (integrated circuit) for an interface between the microcomputer 12 and the CAN bus. Specifically, the CAN transceiver 11 outputs data generated by the microcomputer 12 to the CAN bus, and outputs data input from the CAN bus to the microcomputer 12.

The microcomputer 12 is a microcomputer for controlling communication with the motor ECU 2 according to the CAN protocol. In the microcomputer 12, the communication unit 121, the transmitting buffer 122, the receiving buffer 123, and the register 126 are configured with hardware, and the platform 124 and the control unit 125 are configured with software.

The communication unit 121 is a hardware unit for executing transmission and reception of data according to the CAN protocol. Specifically, when data is stored in the transmitting buffer 122, the communication unit 121 outputs the data stored in the transmitting buffer 122 to the CAN bus via the CAN transceiver 11 according to the CAN protocol. When data is received from the CAN transceiver 11, the communication unit 121 stores the received data in the receiving buffer 123. A concrete example of a data transmitting process (communication mediation) executed based on the CAN protocol will be described later with reference to FIG. 7.

The communication unit 121 is a processing unit for performing the retransmitting process of data when a transmission error of data occurs. Specifically, the communication unit 121 includes a transmitting register 121a that temporarily latches data output to the CAN bus and a receiving register 121b that temporarily latches data input from the CAN bus.

The retransmitting process executed by the communication unit 121 will be described. The retransmitting process is a process which is automatically executed according to the CAN protocol by the communication unit 121.

When data stored in the transmitting buffer 122 is output to the CAN bus, the communication unit 121 acquires the data which the communication unit 121 has output to the CAN bus from the CAN bus and stores the acquired data in the receiving register 121b.

The communication unit 121 refers to the data stored in the receiving register 121b and checks whether or not a data output to the CAN bus has been normally performed. When the data output to the CAN bus has not been normally performed, the communication unit 121 detects that a transmission error has occurred and outputs the data stored in the transmitting register 121a, that is, the data having the transmission error to the CAN bus again.

Further, when the transmission error has been detected, the communication unit 121 performs a process of setting a transmission error flag of the register 126 to ON. When the retransmitting process has been performed, the communication unit 12 performs a process of setting the transmission error flag to OFF.

The register 126 is a temporary storage unit that latches various status flags referred to by the control unit 125. For example, the register 126 holds a transmission error flag representing that a transmission error has occurred, a last flag representing a last communication processing period in a communication period, a transmission stop flag representing a transmission stop status, and the like.

The transmitting buffer 122 is a hardware unit that temporarily stores data to be transmitted to another ECU (here, the motor ECU 2). The receiving buffer 123 is a hardware unit that temporarily stores data received from another ECU (here, the motor ECU 2).

A CAN transceiver, a communication unit, a transmitting buffer, a receiving buffer, and a register which are used in the conventional CAN communication may be used as the CAN transceiver 11, the communication unit 121, the transmitting buffer 122, the receiving buffer 123, and the register 126, respectively. However, the present invention is not limited thereto. In other words, there may be used a CAN transceiver, a communication unit, a transmitting buffer, a receiving buffer, and a register which are dedicated to the communication system according to the present embodiment.

The platform 124 is a processing unit that transfers data generated by the control unit 125 which is a software unit to the transmitting buffer 122 which is a hardware unit. Further, the platform 124 is a processing unit that transfers data received from the receiving buffer 123 which is a hardware unit to the control unit 125 which is a software unit.

The control unit 125 is, for example, a CPU (central processing unit) and is a software unit that executes processing related to communication with the motor ECU 2 and the like. Particularly, the control unit 125 includes the data storage processing unit 125a, the reception completion processing unit 125b, and the retransmission control unit 125c.

The data storage processing unit 125a is a processing unit that causes data to be transmitted to the motor ECU 2 to be stored in the transmitting buffer 122 via the platform 124. Specifically, the data storage processing unit 125a divides data to be transmitted to the motor ECU 2 into predetermined blocks (for example, for every four frames), and stores the divided data in the transmitting buffer 122 in each communication processing period.

Particularly, when a predetermined communication period starts, the data storage processing unit 125a stores data including a start ID representing the start of the communication period in the transmitting buffer 122. A frame format of frame data transmitted or received in the communication system according to the present embodiment will be described with reference to FIG. 4. FIG. 4 is a diagram illustrating an example of a frame format of frame data.

For example, frame data includes data information of 0 to 8 bytes as illustrated in FIG. 4. The frame data includes an ID. For example, the ID is represented by a value of 11 bits. In the conventional CAN communication, the ID is information representing not only the type of data but also a priority order of data for communication mediation.

As the ID included in the frame data, two types of IDs, i.e. a "normal ID" and a "control ID." The normal ID represents the type of normal data or data such as a "torque instruction value" or a "motor rotation number," and a priority order of the data. The control ID includes control information such as a "start ID" representing the start of a predetermined communication period in addition to a priority order of data or an "inspection ID" for instructing a mode transition to an inspection mode.

In other words, in the communication system according to the present embodiment, the "control ID" is included in the ID used in the conventional CAN communication, and the "start ID" is included as one of the "control IDs." As described above, the "start ID" is information that represents not only a priority order of data but also the start of a predetermined communication period.

The control ID allocated to the control information may be included independently of the normal ID allocated to normal data. In this case, the control ID needs not necessarily have as many bits (here, 11 bits) as the ID used in the conventional CAN communication and may be represented by a smaller number of bits.

Further, the information representing the start of a predetermined communication period is included in the ID, but the present invention is not limited thereto. For example, command information representing the start of a predetermined communication period may be included as data. In this case, the ID is an ID representing certain data in the normal ID, only data content may be replaced with command information, and a non-used ID may be used as an ID for command information transmission.

Further, when data is stored in the transmitting buffer 122, the data storage processing unit 125a refers to the transmission stop flag of the register 126, and then stores data in the transmitting buffer 122 when the transmission stop flag remains set to OFF. However, when the transmission stop flag remains set to ON, the data storage processing unit 125a does not store data in the transmitting buffer 122. In this case, data transmission from the HV-ECU 1 is not performed.

Referring back to FIG. 3, the description of the control unit 125 of the HV-ECU 1 continues. The reception completion processing unit 125b is a processing unit for performing a reception completion process when last frame data is received from the motor ECU 2 within a predetermined communication period.

For example, when last frame data is received from the motor ECU 2, the reception completion processing unit 125b executes the checksum and determines whether or not all frame data has been normally received from the motor ECU 2.

The retransmission control unit 125c is a processing unit for inhibiting the retransmitting process in a predetermined communication period when the number of times that a transmission error is detected in the communication period is larger than the first threshold value. Further, the retransmission control unit 125c performs a process for releasing inhibition of the retransmitting process when the communication period in which the retransmitting process inhibited ends and the next communication period starts.

Specifically, the retransmission control unit 125c causes a transmission determining counter to count up each time when the transmission error flag of the register 126 is set to ON. Then, when the count value of the transmission determining counter is larger than the first threshold value (hereinafter, referred to as a "transmission stop determination threshold value," a retransmission stop command is notified to the communication unit 121, and so a retransmitting process function of the communication unit 121 is turned off. When the retransmission stop command is notified to the communication unit 121, the retransmission control unit 125c reset the count value of the transmission determining counter to zero (0).

Further, when the count value of the transmission determining counter is larger than the transmission stop determination threshold value, the retransmission control unit 125c sets the transmission stop flag of the register 126 to ON. When the transmission stop flag is set to ON, the data storage processing unit 125a stops storing data in the transmitting buffer 122.

Further, when a last communication processing period in a communication period ends (that is, when a communication period ends), the retransmission control unit 125c notifies the communication unit 121 of a retransmission stop release command and causes the retransmitting process function of the communication unit 121 to be turned on. As a result, the retransmission inhibition state of the communication unit 121 is released. Further, when the last communication processing period in the communication period ends, the retransmission control unit 125c sets the transmission stop flag of the register 126 to OFF. As a result, the communication unit 121 resumes storing data in the transmitting buffer 122.

A concrete operation example of a retransmission control process performed by the retransmission control unit 125c will be described later with reference to FIG. 8.

Further, the retransmission control unit 125c performs a threshold value deciding process for deciding the transmission stop determination threshold value based on a detection timing of a transmission error in a communication period. Through the threshold value deciding process, a time necessary for reception of remaining data is secured, and the retransmitting process can be performed continuously many times as long as possible. The details of the threshold value deciding process will be described later with reference to FIG. 9.

In FIG. 3, only the data storage processing unit 125a, the reception completion processing unit 125b, and the retransmission control unit 125c are illustrated as the processing units arranged in the control unit 125. However, the control unit 125 may include another processing unit such as a calculation processing unit that performs a predetermined calculation using data received from the motor ECU 2.

Next, a configuration of the motor ECU 2 will be described. Hardware of the motor ECU 2, specifically, the CAN transceiver 21, the communication unit 221, the transmitting buffer 222, and the receiving buffer 223 have the same configuration as hardware of the HV-ECU 1, and thus a description thereof will not be made. The platform 224 is the same processing unit as the platform 124 of the HV-ECU 1, and thus a description thereof will not be made.

The motor ECU 2 may include the transmitting register 121a, the receiving register 121b, the register 126, and the like which are arranged in the HV-ECU 1.

The control unit 225 of the motor ECU 2 is, for example, a CPU and is a software unit that executes processing related to communication with the HV-ECU 1 or the like. The control unit 225 includes the ID reading unit 225a, the data storage processing unit 225b, and the like. The control unit 225 may include the reception completion processing unit 125b, the retransmission control unit 125c, and the like which are arranged in the control unit 125 of the HV-ECU 1.

The ID reading unit 225a is a processing unit that reads an ID of data stored in the receiving buffer 223 and performs a process for transferring the start ID to the data storage processing unit 225b when the read ID is the start ID. An ID used as the start ID is decided in advance.

The data storage processing unit 225b is a processing unit that stores data to be transmitted to the HV-ECU 1 in the transmitting buffer 222 via the platform 224. The data storage processing unit 225b receives the start ID from the ID reading unit 225a and performs a process for storing data corresponding to the received start ID, that is, data to be transmitted within a predetermined communication period to the transmitting buffer 222 collectively other than in units of blocks.

Here, a correspondence relation between data to be transmitted within a communication period and the start ID will be described with reference to FIG. 5. FIG. 5 is a diagram illustrating an example of a correspondence relation between data to be transmitted within a communication period and the start ID.

As illustrated in FIG. 5, a start ID is associated with data to be transmitted within the communication period in advance. In the example illustrated in FIG. 5, a start ID "1111*" is associated with "data A", and a start ID "1122*" is associated with "data B". Here, "data A" and "data B" represent the type of data other than a value of data.

For example, when the start ID "1111***" representing the start of a process for changing the torque instruction value is received, the data storage processing unit 225b acquires a torque value of the motor 3 and the like as "data A", and collectively the acquired data in the transmitting buffer 222.

In FIG. 3, only the ID reading unit 225a and the data storage processing unit 225b are illustrated as the processing units arranged in the control unit 225, but the control unit 225 may include another control unit. For example, the control unit 225 may include a reception completion processing unit that executes the reception completion process when last frame data is received from the HV-ECU 1, a motor control unit that controls the motor 3 according to a control command received from the HV-ECU 1, or the like.

Figure 6A:
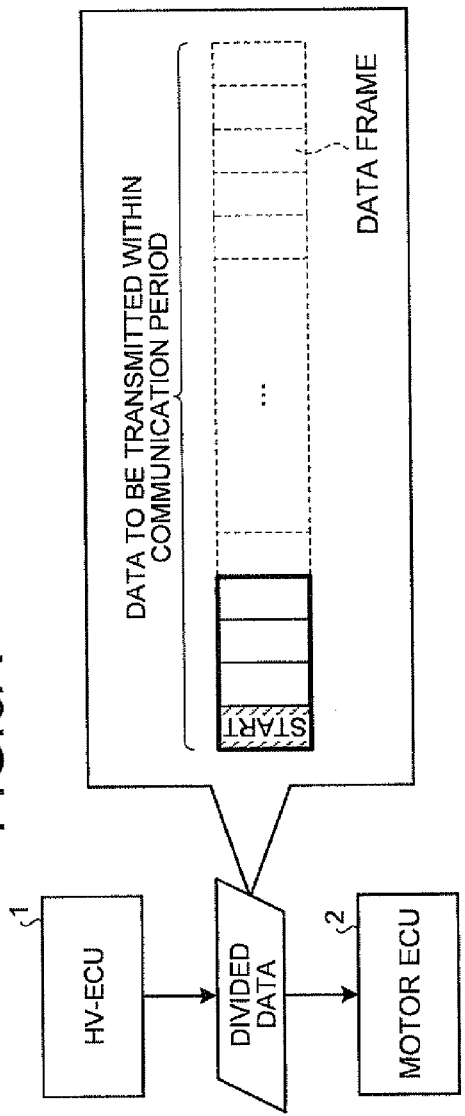
FIGS. 6A and 6B are diagrams illustrating an operation example of a HV-ECU and a motor ECU.
Figure 6B:
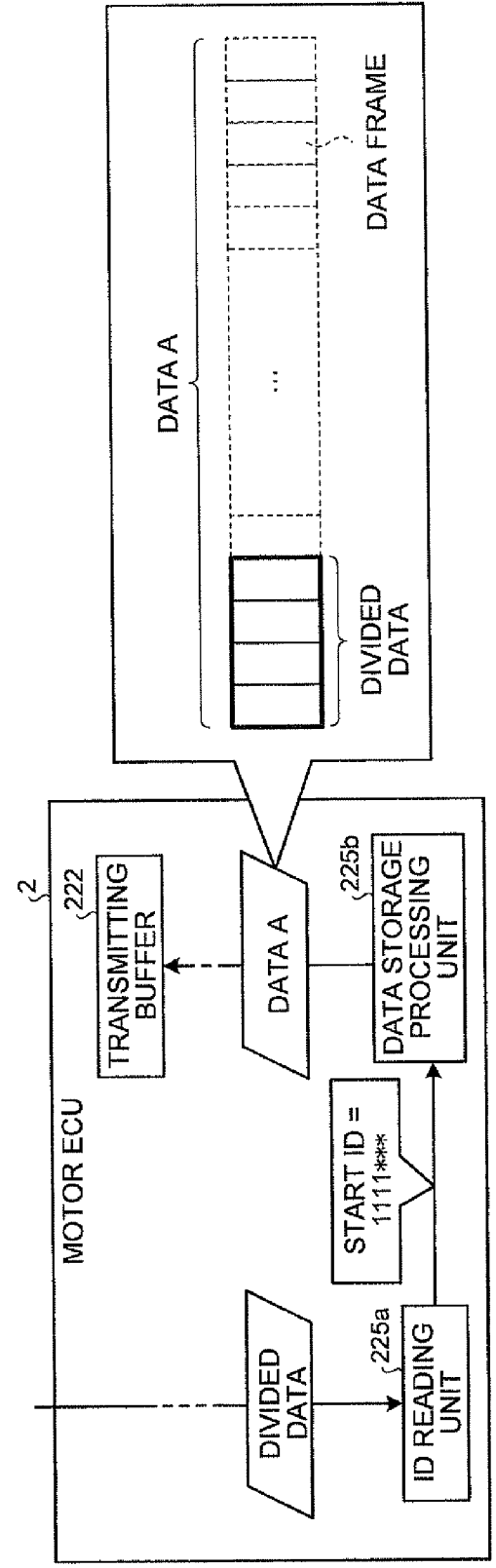

Next, an operation example of the HV-ECU 1 and the motor ECU 2 will be described. FIGS. 6A and 6B are diagrams illustrating an operation example of the HV-ECU 1 and the motor ECU 2. Specifically, FIG. 6A illustrates an operation example of the HV-ECU 1 when the data transmitting process is performed. FIG. 6B illustrates an operation example in which the motor ECU 2 receives data from the HV-ECU 1 and then stores the corresponding data in the transmitting buffer 222.

As illustrated in FIG. 6A, when a new communication period comes, the HV-ECU 1 starts transmitting data to the motor ECU 2. Specifically, in the HV-ECU 1, the data storage processing unit 125a stores divided data, which is obtained by dividing data to be transmitted within the communication period for every four frames, in the transmitting buffer 122 in each communication processing period of the own device.

Further, in the HV-ECU 1, the communication unit 121 outputs the divided data to the CAN bus via the CAN transceiver 11 each time when the divided data is stored in the transmitting buffer 122.

At this time, the start ID representing the start of the communication period is included in frame data in a head of divided data to be initially transmitted from the HV-ECU 1 to the motor ECU 2. Here, the data to be transmitted within the communication period is divided for every four frames, but the data may not be divided for every four frames.

When the current communication period starts, the HV-ECU 1 performs a calculation process for calculating a torque amount (a torque instruction value) or the like which needs to be output by a motor or an engine based on information related to a motor status such as a motor rotation number transmitted from the motor ECU 2 in the previous communication period (control period), a status of an accelerator depressed by a driver (a torque amount required by the driver) transmitted from another bus, various pieces of information related to vehicle control such as a battery charging status, or the like.

Meanwhile, in the motor ECU 2, when a reception interrupt is received from a hardware unit, the ID reading unit 225a reads an ID included in the divided data received from the HV-ECU 1 as illustrated in FIG. 6B. When the start ID is included in the read ID, the ID reading unit 225a transfers the start ID to the data storage processing unit 225b. Here, it is assumed that the start ID is "1111***."

When the start ID is received from the ID reading unit 225a, the data storage processing unit 225b acquires data corresponding to the received start ID, and stores the acquired data in the transmitting buffer 222. Here, since the start ID "1111*" has been received, the data storage processing unit 225b acquires the data A corresponding to the start ID "1111*" from the motor 3 (see FIG. 5), and stores the acquired data A in the transmitting buffer 222.

When the start ID is received from the HV-ECU 1, the motor ECU 2 sets, to the transmitting buffer 222, information related to a status of the motor (a status of the motor after the motor is controlled based on the torque instruction value or the like transmitted from the HV-ECU 1 in the previous communication period) such as the acquired current motor rotation number, data that needs to be transmitted to the HV-ECU 1 among the calculation results by the motor ECU 2 in the previous communication period, or the like.

Figure 7:
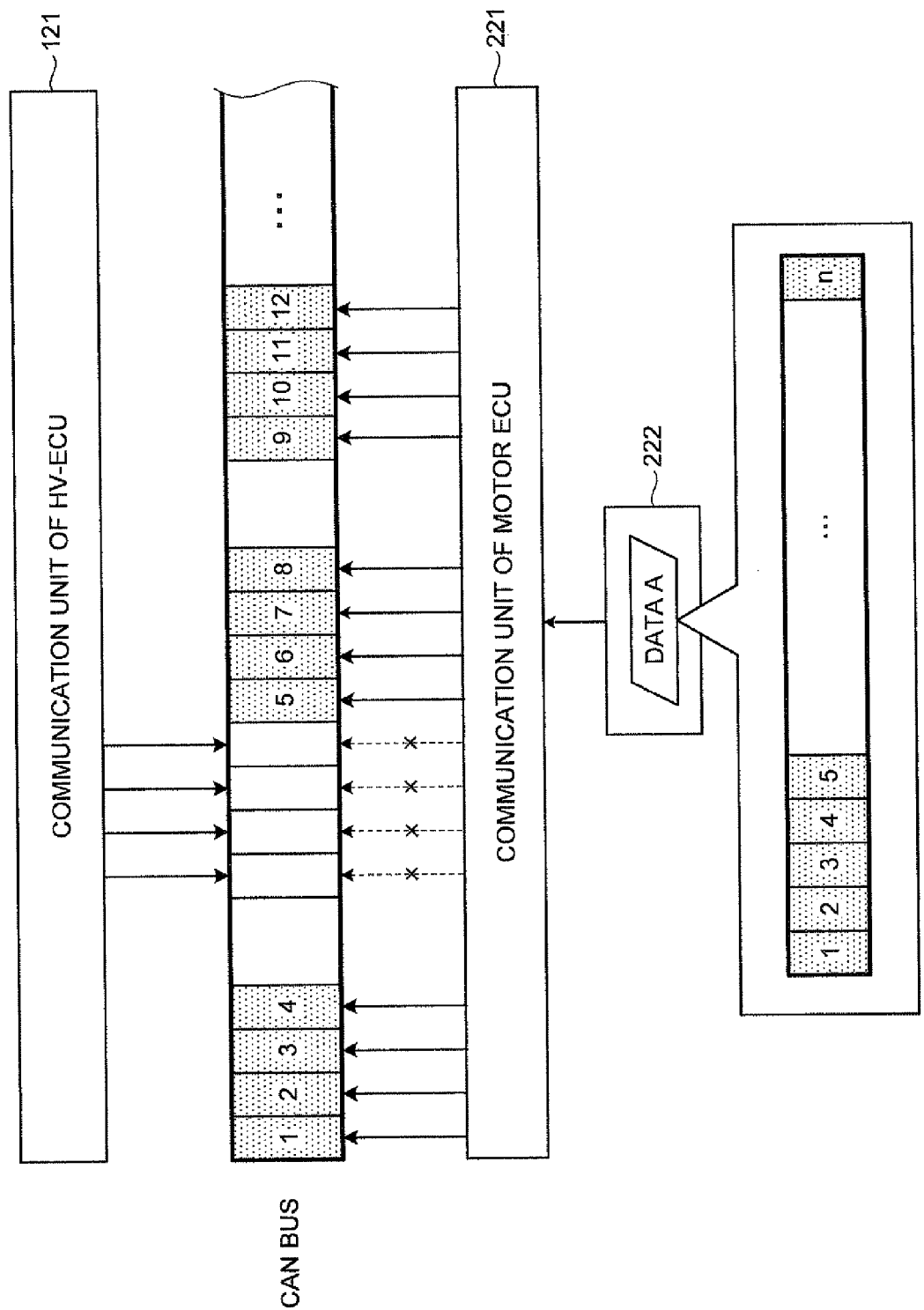
FIG. 7 is a diagram illustrating an example of a data output process based on a CAN protocol.

Next, an operation example of a process for outputting data stored in the transmitting buffer 222 to the CAN bus according to the CAN protocol by the communication unit 221 of the motor ECU 2 will be described with reference to FIG. 7. FIG. 7 is a diagram illustrating an example of a data output process based on the CAN protocol. Here, FIG. 7 illustrates an example in which the data A stored in the transmitting buffer 222 is configured with n pieces of frame data.

As illustrated in FIG. 7, the communication unit 221 of the motor ECU 2 outputs data to the CAN bus while appropriately performing communication mediation with the HV-ECU 1. Specifically, when frame data is stored in the transmitting buffer 222, the communication unit 221 checks whether or not the CAN bus is in an idle state. When it is determined that the CAN bus is in the idle state, the communication unit 221 outputs the data A stored in the transmitting buffer 222 to the CAN bus frame by frame. In the example illustrated in FIG. 7, frame data 1 to 4 are output to the CAN bus.

Let us assume that a competition for the CAN bus with the HV-ECU 1 has occurred when the communication unit 221 of the motor ECU 2 tries to output frame data 5 to the CAN bus. In this case, the communication unit 221 gives priority to a data output of the HV-ECU 1, and then outputs the frame data 5 to the CAN bus when the CAN is in the idle state. This is because a priority order of data from the motor ECU 2 is set to be lower than a priority order of data from the HV-ECU 1.

As described above, in the communication system according to the first embodiment, the data storage processing unit 125a of the HV-ECU 1 stores data including the start ID representing the start of a predetermined communication period in the transmitting buffer 122, and the communication unit 121 of the HV-ECU 1 outputs the data stored in the transmitting buffer 122 to the CAN bus according to the CAN protocol.

Further, the communication unit 221 of the motor ECU 2 performs the process for storing data input from the CAN bus in the receiving buffer 223 and the process for outputting the data stored in the transmitting buffer 222 to the CAN bus according to the CAN protocol. When the start ID is included in the data stored in the receiving buffer 223, the data storage processing unit 225b of the motor ECU 2 starts the process for storing data, which corresponds to the start ID and is to be transmitted within a predetermined communication period, in the transmitting buffer 222, so that the data to be transmitted is sequentially stored when the transmitting buffer 222 becomes empty.

Specifically, when frame data is stored in the transmitting buffer 222, the communication unit 221 of the motor ECU 2 continually outputs each frame data stored in the transmitting buffer 222 to the CAN bus. However, when a competition for the CAN bus with the HV-ECU 1 has occurred, the communication unit 221 of the motor ECU 2 gives priority to data output from the HV-ECU 1.

As described above, in the communication system according to the first embodiment, when the transmission process of the HV-ECU 1 and the transmission process of the motor ECU 2 are evoked at the same time, the transmission process of the HV-ECU 1 is prioritized over the transmission process of the motor ECU 2.

Here, communication in the communication system is the CAN communication in which communication is performed according to the CAN protocol, but the present invention is not limited thereto. For example, communication can be performed according to any other communication protocol to the extent that simultaneous transmission from a plurality of communication apparatuses is not allowed, similarly to the CAN communication.

Figure 8A:
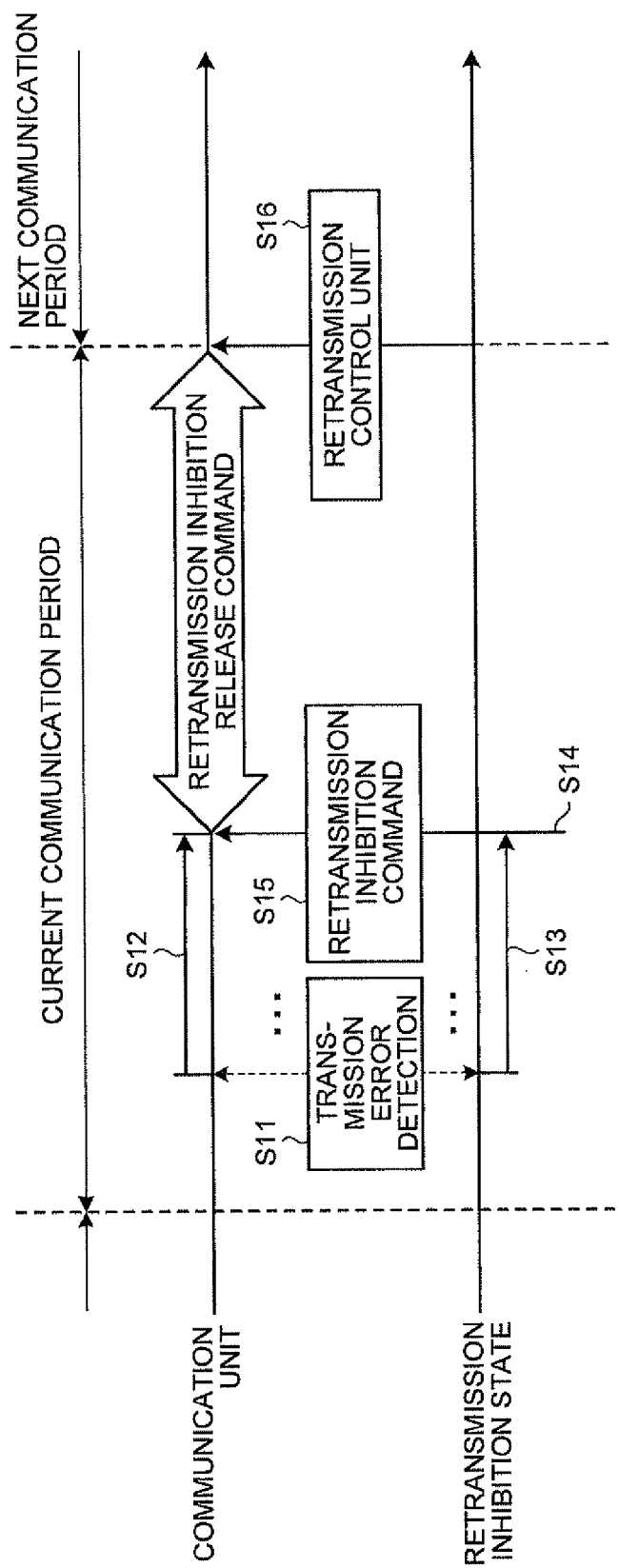
FIG. 8A and FIG. 8B are diagrams illustrating an operation example of a communication unit and a retransmission control unit.
Figure 8B:
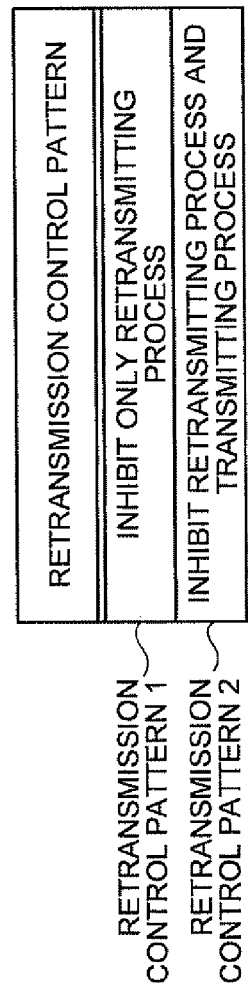

Next, an operation example of the communication unit 121 and the retransmission control unit 125c will be described with reference to FIGS. 8A and 8B. FIG. 8A and FIG. 8B are diagrams illustrating an operation example of the communication unit 121 and the retransmission control unit 125c. FIG. 8A illustrates an operation example of the communication unit 121 and the retransmission control unit 125c, and FIG. 8B illustrates a retransmission control pattern of the retransmission control unit 125c.

It is assumed that each of the communication unit 121 and the retransmission control unit 125c has detected a transmission error as illustrated in FIG. 8A (see step S11 of FIG. 8A). Specifically, the communication unit 121 detects the transmission error by referring to data latched in the receiving register 121b, and the retransmission control unit 125c detects the transmission error by referring to the transmission error flag of the register 126.

When the transmission error is detected, the communication unit 121 performs the retransmitting process (see step S12 of FIG. 8A). Further, when the transmission error is detected, the retransmission control unit 125c causes a transmission stop determining counter to perform a counting process (see step S13 of FIG. 8A). In FIG. 8A, it is assumed that when the transmission error continuously occurs, and the retransmitting process and the counting process are continuously performed.

Here, when the count value of the transmission stop determining counter is larger than the transmission stop determination threshold value (see step S14 of FIG. 8A), the retransmission control unit 125c notifies the communication unit 121 of the retransmission stop command (see step S15 of FIG. 8A). Thus, the retransmission function is turned off, and so the retransmitting process stops.

When the next communication period starts after the last communication processing period in the current communication period ends, the retransmission control unit 125c notifies the communication unit 121 of the retransmission stop release command (see step S16 of FIG. 8A). Thus, the retransmission function is turned on. In other words, the retransmission inhibition state of the communication unit 121 is maintained only in the current communication period.

FIG. 8A has been described in connection with the example in which the retransmitting process is inhibited when the count value of the transmission stop determining counter (i.e., the number of times that a transmission error is detected or a detection time period of a transmission error) is larger than the transmission stop determination threshold value. However, the retransmission control unit 125c may stop a normal data transmitting process as well as the retransmitting process.

In other words, as the retransmission control process performed by the retransmission control unit 125c, there are a pattern of inhibiting only the retransmitting process and a pattern of inhibiting both the retransmitting process and the normal data transmitting process (hereinafter, referred to simply as "transmitting process") as illustrated in FIG. 8B. The control unit 125 of the HV-ECU 1 can arbitrarily change the retransmission control pattern.

When only the retransmitting process is inhibited (in case of a retransmission control pattern 1), the retransmission control unit 125c performs only a process of notifying the communication unit 121 of the retransmission stop command. However, when both the retransmission process and the transmitting process are inhibited (in case of a retransmission control pattern 2), the retransmission control unit 125c performs a process of notifying the communication unit 121 of the retransmission stop command and a process of setting the transmission stop flag of the register 126 to ON.

Further, when the retransmitting process or the transmitting process is inhibited, a process of deleting frame data of an inhibition target from the transmitting buffer 122 is performed as necessary.

Next, the threshold value deciding process performed by the retransmission control unit 125c will be described with reference to FIGS. 9A and 9B. FIGS. 9A and 9B are diagrams illustrating examples of the threshold value deciding process. FIG. 9A illustrates an example of the threshold value deciding process in case of the retransmission control pattern 2, and FIG. 9B illustrates an example of the threshold value deciding process in case of the retransmission control pattern 1.

As illustrated in FIG. 9A, when a transmission error is detected in a communication period for the first time, the retransmission control unit 125c decides the transmission stop determination threshold value based on a time (T1) necessary until all remaining data (non-received data) that needs to be received in a predetermined communication period is received and a remaining time (T2) of the predetermined communication period.

For example, the retransmission control unit 125c calculates the allowable number of times that a transmission error is detected by dividing a time obtained by deducting T1 from T2 by a detection time interval of a transmission error (a time necessary for performing the transmitting process or the retransmitting process once). Then, the retransmission control unit 125c decides the calculated number of times of detection or a time based on the number of times of detection as the transmission stop determination threshold value.

Thus, the retransmission control unit 125c can secure a time necessary for receiving remaining data and can maintain the retransmission process as long as possible. The HV-ECU 1 holds information about the number and the size of data that has to be received within the communication period and a time necessary for receiving one frame data in advance, and can calculate T2 based on this information. Further, it is assumed information about a detection time interval of a transmission error is held in advance.

Meanwhile, in case of the retransmission control pattern 1 (when only the retransmitting process is inhibited, the retransmission control unit 125c may decide the transmission stop determination threshold value by further considering a time (T3) necessary until all non-received data is received. For example, the retransmission control unit 125c calculates the allowable number of times that a transmission error is detected by dividing a time obtained by deducting T1 and T3 from T2 by a detection time interval of a transmission error, and then decides the calculated number of times of detection as the transmission stop determination threshold value.

As described above, when a transmission error of data is detected, the retransmission control unit 125c decides the transmission stop determination threshold value based on a time necessary until all remaining data that has to be received in a predetermined communication period is received and a remaining time of the predetermined communication period. Thus, a time necessary for receiving remaining data can be secured, and the retransmission process can be maintained as long as possible.

In FIGS. 9A and 9B, the transmission stop determination threshold value is decided so that the retransmitting process can be repeated until immediately before a time obtained by deducting T1 from T2 or a time obtained by deducting T1 and T3 from T2 elapses. However, the present invention is not limited thereto.

Specifically, the transmission stop determination threshold value is decided under the assumption that transmission and reception of data is delayed according to the retransmitting process, but transmission and reception of data may be delayed according to a cause other than the retransmitting process. Thus, the retransmission control unit 125c may decide the transmission stop determination threshold value based on a time obtained by deducting a predetermined offset time from a time obtained by deducing T1 from T2 or a time obtained by deducting T1 and T3 from T2.

Figure 10:
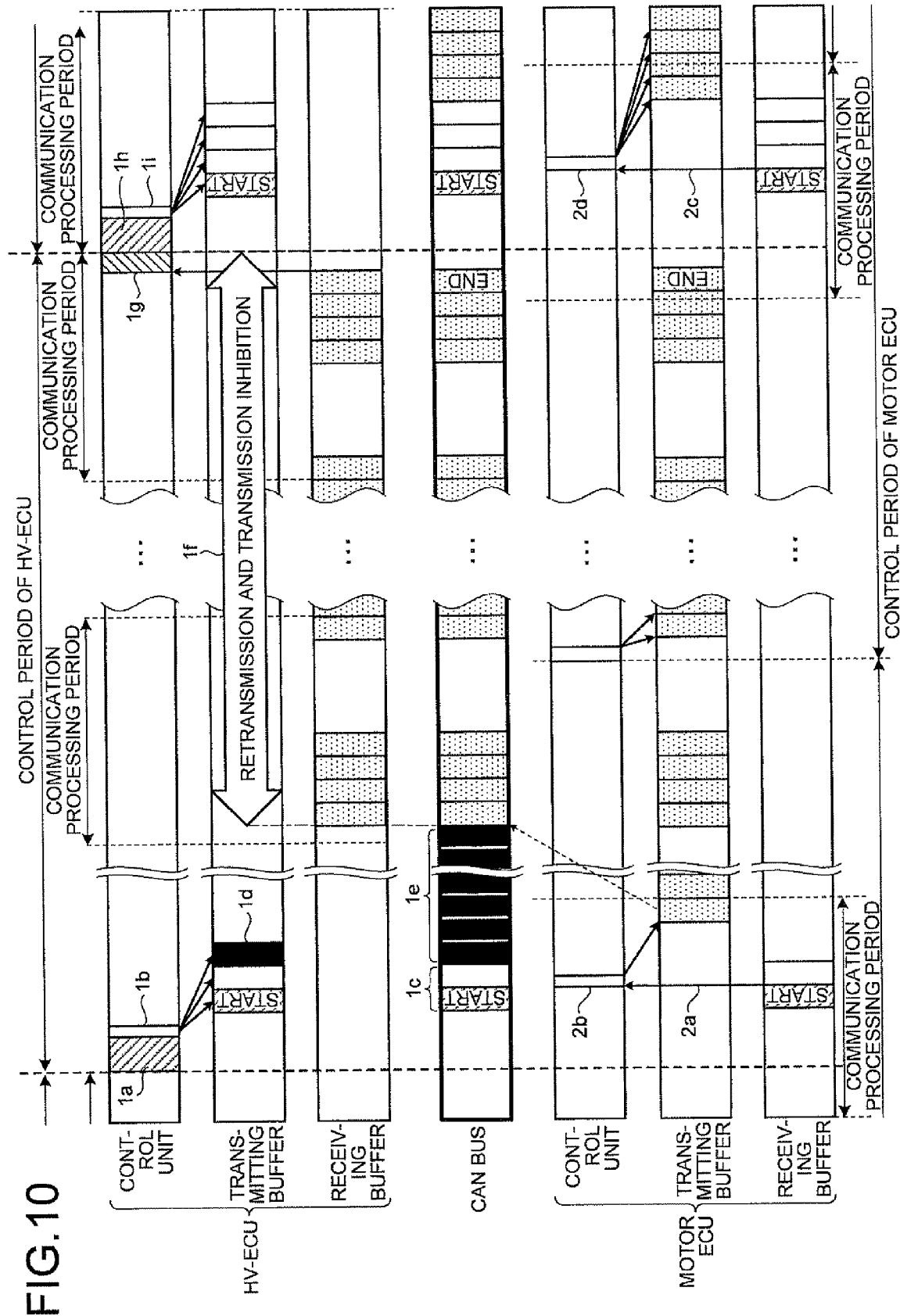
FIG. 10 is a timing chart illustrating an example of a communication timing of a HV-ECU and a motor ECU in a predetermined communication period.

Next, a communication timing within a communication period of the HV-ECU 1 and the motor ECU 2 will be described with reference to FIG. 10. FIG. 10 is a timing chart illustrating an example of a communication timing of the HV-ECU 1 and the motor ECU 2 in a predetermined communication period.

In FIG. 10, a communication processing period of each of the HV-ECU 1 and the motor ECU 2 is 1 ms, and a communication period (control period) is 8 ms which corresponds to 8 communication processing periods. Further, FIG. 10 illustrates an example in which the HV-ECU 1 is not synchronized in a start/end timing of a communication period with the motor ECU 2, and the length of the communication processing period and the length of the communication period of the HV-ECU 1 are set to be the same as those of the motor ECU 2, respectively. Further, FIG. 10 illustrates the case of the retransmission control pattern 2 of FIG. 8B.

As illustrated in FIG. 10, when a communication period comes, the control unit 125 of the HV-ECU 1 performs a process for latching data acquired in the previous communication period or a process for calculating a SUM value of data which has to be transmitted in the current communication period (see "1a" of FIG. 10).

The SUM value refers to a value obtained by adding values of information (an ID, data, and the like), included in each frame data but excluding a SUM value, which is represented by a binary number of 0 and 1. The calculated Sum value is added to each frame data.

Then, when the above process ends, the control unit 125 of the HV-ECU 1 stores last divided data among divided data of data to be transmitted to the motor ECU 2 in the transmitting buffer 122 (see "1b" of FIG. 10). The start ID is included in frame data of a head of the divided data.

When the divided data is stored in the transmitting buffer 122 of the HV-ECU 1, the communication unit 121 of the HV-ECU 1 outputs the divided data stored in the transmitting buffer 122 to the CAN bus (see "1c" of FIG. 10). The divided data output to the CAN bus is input to the communication unit 221 of the motor ECU 2, and is stored in the receiving buffer 223 by the communication unit 221.

When the divided data is stored in the receiving buffer 223, the control unit 225 of the motor ECU 2 generates a reception interrupt, and reads an ID of the divided data stored in the receiving buffer 223 (see "2a" of FIG. 10).

At this time, when the read ID includes the start ID, the control unit 225 of the motor ECU 2 stores a part (the divided data) of data corresponding to the start ID in the transmitting buffer 222 (see "2b" of FIG. 10).

When the data is stored in the transmitting buffer 222, the communication unit 221 of the motor ECU 2 outputs the data stored in the transmitting buffer 222 to the CAN bus frame by frame. Here, when a competition for the CAN bus with the HV-ECU 1 occurs, a data output is resumed after it is on standby until data is completely output from the HV-ECU 1.

The start ID is embedded in frame data initially transmitted from the HV-ECU 1 in a predetermined communication period. Thus, the motor ECU 2 can start a process for storing data to be transmitted within a communication period in the transmitting buffer 222 at an early stage in the communication period.

Thus, it is possible to reliably prevent the occurrence of a time in which the CAN bus becomes idle between when a last frame is output from the HV-ECU 1 to the CAN bus in the first communication processing period and when first data from the motor ECU 2 is output to the CAN bus.

Here, let us assume that a transmission error of frame data occurs in the HV-ECU 1 (see "1d" of FIG. 10). In this case, the communication unit 121 of the HV-ECU 1 continues the retransmitting process while the transmission error is being detected (see "1e" of FIG. 10). As a result, the same frame data is continuously output to the CAN bus.

When the number of times that a transmission error is detected is larger than the transmission stop determination threshold value, the HV-ECU 1 inhibits the retransmitting process by the communication unit 121 until the next communication period starts and inhibits normal data transmission until the next communication period starts (see "1f" of FIG. 10).

Thus, data stored in the transmitting buffer 222 of the motor ECU 2 is output to the CAN bus without being disturbed by retransmission data or normal data from the HV-ECU 1. Thus, the HV-ECU 1 can reliably receive data from the motor ECU 2 even when a transmission error occurs.

Further, when a last frame of data which has to be received within the communication period is received from the motor ECU 2, the control unit 125 of the HV-ECU 1 executes the reception completion process (see "1g" of FIG. 10). Specifically, in the HV-ECU 1, the reception completion processing unit 125b calculates a SUM value of data received within the communication period, and performs the checksum on whether or not the SUM value is normal by comparing the calculated SUM value with a SUM value transmitted from the HV-ECU 1.

Here, the example in which the checksum is performed on all frame data received in one communication period at once has been described. However, the present invention is not limited to this, and the checksum may be executed each time when frame data is received.

Further, when the next communication period comes, the HV-ECU 1 releases the inhibition state of the retransmitting process and the transmitting process. Thus, the control unit 125 of the HV-ECU 1 starts the transmitting process of data to be transmitted to the motor ECU 2 in the next communication period.

In other words, the HV-ECU 1 performs the data latching process or the SUM value calculating process (see "1h" of FIG. 10), and stores first divided data among divided data of data to be transmitted to the motor ECU 2 in the transmitting buffer 122 (see "1i" of FIG. 10). The divided data stored in the transmitting buffer 122 is input to the communication unit 221 of the motor ECU 2 via the CAN bus, and then is stored in the receiving buffer 223 by the communication unit 221.

When the divided data is stored in the receiving buffer 223, the control unit 225 of the motor ECU 2 generates a reception interrupt, and reads an ID of the divided data stored in the receiving buffer 223 (see "2c" of FIG. 10). When the read ID includes the start ID, the control unit 225 of the motor ECU 2 stores data corresponding to the start ID in the transmitting buffer 222 (see "2d" of FIG. 10). The data stored in the transmitting buffer 222 is sequentially output to the CAN bus when the CAN bus is in the idle state.

Further, for example, when reception of data which has to be received in the current communication period is not completed due to a cause other than the retransmitting process, the HV-ECU 1 may deal data received in a communication period (for example, the previous communication period) prior to a predetermined communication period as data received in the current communication period and perform a calculation process.

Thus, by performing the calculation process in a state in which data received in the current communication period is mixed with data received in the previous communication period, it is possible to prevent a situation in which an abnormal calculation result is output.

Figure 11:
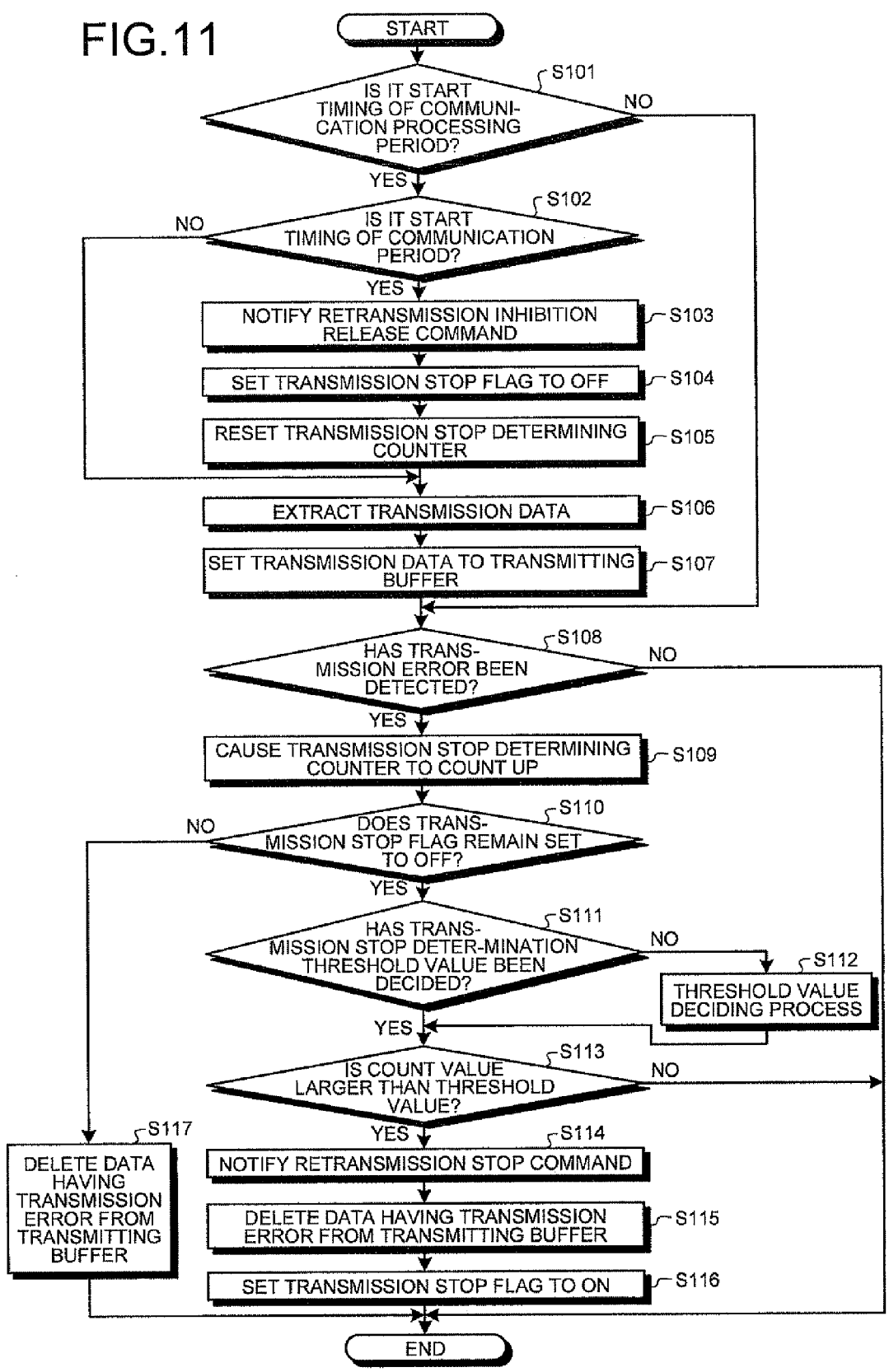
FIG. 11 is a flowchart illustrating a processing procedure of a transmitting process (1 thereof)

Next, a processing procedure of the transmitting process executed by the HV-ECU 1 will be described with reference to FIG. 11. FIG. 11 is flowchart illustrating a processing procedure of the transmitting process (1 thereof). FIG. 11 illustrates a processing procedure when the retransmission control pattern is the pattern 1 (the pattern for inhibiting only the retransmitting process). The transmitting process illustrated in FIG. 11 is executed at predetermined time intervals (at intervals of a time shorter than the communication processing period).

As illustrated in FIG. 11, the retransmission control unit 125c determines whether it is a start timing of a communication processing period (step S101). Specifically, the retransmission control unit 125c determines whether or not it is the start timing of the communication processing period by counting a time from a start timing of an immediately previous communication processing period.

When it is determined in this processing that it is the start timing of the communication processing period (Yes in step S101), the retransmission control unit 125c determines whether or not it is a start timing of a communication period (step S102). Specifically, in the start timing of the communication processing period, when a last flag of the determining register 126, which is a flag set to ON when the process of the last communication processing period in the communication period is performed, remains set to ON, the retransmission control unit 125c determines that it is a start timing of a new communication period.

When it is determined in this processing that it is the start timing of the communication period (Yes in step S102), the retransmission control unit 125c notifies the communication unit 121 of the retransmission stop release command (step S103), and then sets the transmission stop flag of the register 126 to OFF (step S104). Then, the retransmission control unit 125c resets the transmission stop determining counter (step S105).

Further, when the retransmission stop command has not been notified in the immediately previous communication period, the processes of steps S103 and S104 may be skipped.

When the process of step S105 is completed or when it is determined in step S102 that it is not the start timing of the communication period (No in step S102), the data storage processing unit 125a extracts transmission data (step S106), and sets the extracted transmission data to the transmitting buffer 122 (step S107).

When the process of step S107 is completed or when it is determined in step S101 that it is not the start timing of the communication processing period (No in step S101), the retransmission control unit 125c determines whether or not a transmission error has been detected (step S108). Specifically, when the transmission error flag of the register 126 remains set to ON, the retransmission control unit 125c determines that a transmission error has been detected.

When it is determined in this processing that a transmission error has been detected (Yes in step S108), the retransmission control unit 125c causes the transmission stop determining counter to count up (step S109). Then, the retransmission control unit 125c determines whether or not the transmission stop flag remains set to OFF (step S110). When it is determined that the transmission stop flag remains set to OFF (Yes in step S110), the retransmission control unit 125c determines whether or not a threshold value has been decided (step S111). Here, when it is determined that the threshold value has not been decided (No in step S111), the threshold value deciding process is performed to decide the threshold value (step S112).

Meanwhile, when the process of step S112 is completed or when it is determined in step S111 that the threshold value has been decided (Yes in step S111), the retransmission control unit 125c determines whether or not the count value of the transmission determining counter is larger than the transmission stop determination threshold value (step S113).

When the count value of the transmission determining counter is larger than the transmission stop determination threshold value (Yes in step S113), the retransmission control unit 125c notifies the communication unit 121 of the retransmission stop command (step S114) and deletes data having the transmission error from the transmitting buffer 122 (step S115). Then, the retransmission control unit 125c sets the transmission stop flag of the register 126 to ON (step S116) and then ends the process.

Meanwhile, when it is determined in step S108 that a transmission error has not been detected (No in step S108) or when it is determined in step S113 the count value of the transmission determining counter is not larger than the transmission stop determination threshold value (No in step S113), the retransmission control unit 125c ends the process.

Meanwhile, when it is determined in step S116 that the transmission stop flag does not remain set to OFF (remains set to ON) (No in step S110), the retransmission control unit 125c deletes data having the transmission error from the transmitting buffer 122 (step S117) and then ends the process.

Figure 12:
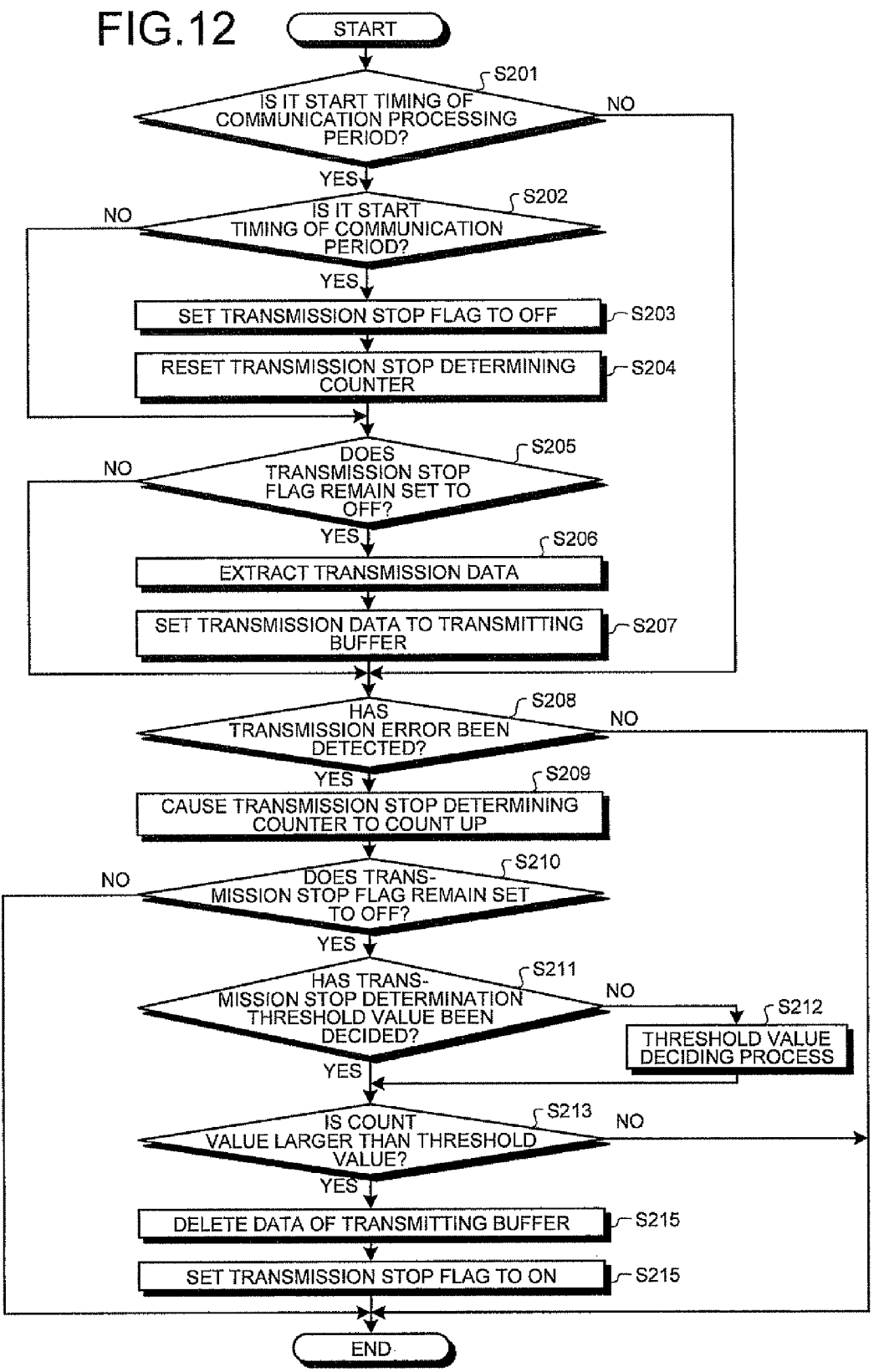
FIG. 12 is a flowchart illustrating a processing procedure of a transmitting process (2 thereof)

Next, a processing procedure of the transmitting process when the transmitting process is inhibited will be described with reference to FIG. 12. FIG. 12 is a flowchart illustrating the processing procedure of the transmitting process (2 thereof).

As illustrated in FIG. 12, the retransmission control unit 125c determines whether or not it is a start timing of a communication processing period (step S201). Specifically, the retransmission control unit 125c determines whether or not it is the start timing of the communication processing period by counting a time from a start timing of an immediately previous communication processing period.

When it is determined in this processing that it is the start timing of the communication processing period (Yes in step S201), the retransmission control unit 125c determines whether or not it is a start timing of a communication period (step S202). Specifically, in the start timing of the communication processing period, when a last flag of the determining register 126, which is a flag set to ON when processing of the last communication processing period in the communication period is performed, remains set to ON, the retransmission control unit 125c determines that it is a start timing of a new communication period.

When it is determined in this processing that it is the start timing of the communication period (Yes in step S202), the retransmission control unit 125c sets the transmission stop flag of the register 126 to OFF (step S203) and then resets the transmission stop determining counter (step S204).

When processing of step S204 is completed or when it is determined in step S202 that it is not the start timing of the communication period (No in step S202), the data storage processing unit 125a determines whether or not the transmission stop flag remains set to OFF (step S205).

When it is determined in this processing that the transmission stop flag remains set to OFF (Yes in step S205), the data storage processing unit 125a extracts transmission data (step S206), and sets the extracted transmission data to the transmitting buffer 122 (step S207).

When the process of step S207 is completed, when it is determined in step S205 that the transmission stop flag does not remain set to OFF (No in step S205), or when it is determined in step S201 that it is not the start timing of the communication processing period (No in step S201), the retransmission control unit 125c determines whether or not a transmission error has been detected (step S208). Specifically, when the transmission error flag of the register 126 remains set to ON, the retransmission control unit 125c determines that a transmission error has been detected.

When it is determined in this processing that a transmission error has been detected (Yes in step S208), the retransmission control unit 125c causes the transmission stop determining counter to count up (step S209).

Then, the retransmission control unit 125c determines whether or not the transmission stop flag remains set to OFF (step S210). When it is determined that the transmission stop flag remains set to OFF (Yes in step S210), the retransmission control unit 125c determines whether or not a threshold value has been decided (step S211). Here, when it is determined that the threshold value has not been decided (No in step S211), the threshold value deciding process is performed to decide the threshold value (step S212).

Meanwhile, when the process of step S212 is completed or when it is determined in step S211 that the threshold value has been decided (Yes in step S211), the retransmission control unit 125c determines whether or not the count value of the transmission determining counter is larger than the transmission stop determination threshold value (step S213).

When the count value of the transmission determining counter is larger than the transmission stop determination threshold value (Yes in step S213), the retransmission control unit 125c deletes all non-transmitted data stored in the transmitting buffer 122 (step S214), sets the transmission stop flag of the register 126 to ON (step S215), and then ends the process.

Meanwhile, when it is determined in step S206 that a transmission error has not been detected (No in step S208), when it is determined in step S208 that the transmission stop flag does not remain set to OFF (No in step S210), or when it is determined in step S213 that the count value of the transmission determining counter is not larger than the transmission stop determination threshold value (No in step S213), the retransmission control unit 125c ends the process.

As described above, in the first embodiment, when the communication unit of the HV-ECU detects a transmission error of data, the retransmitting process of data is performed. When the number of times that a transmission error is detected in a predetermined communication period is larger than the transmission stop determination threshold value, the retransmission control unit of the HV-ECU inhibits the retransmitting process in the communication period, and then releases the retransmitting process when the corresponding communication period ends and then the next communication period starts.

Thus, even when a transmission error occurs, loss of data which has to be received in a predetermined communication period can be prevented.

The first embodiment has been described in connection with the example in which the retransmitting process is inhibited when the number of times that a transmission error is detected is larger than the transmission stop determination threshold value, but the present invention is not limited thereto. For example, the retransmission control unit 125c may inhibit the retransmitting process when a duration time of a transmission error is larger than the transmission stop determination threshold value. In this case, for example, as illustrated in FIG. 9A, a time obtained by deducting a time (T1), which is necessary until all remaining data which has to be received in a predetermined communication period is received, from a remaining time (T2) of the predetermined communication period may be decided as the transmission stop determination threshold value.

Meanwhile, in the first embodiment, one transmission stop determination threshold value is decided by the threshold value deciding process, and one transmission stop determination threshold value is uniformly applied regardless of the type of frame data which becomes a target of a transmission error. However, the present invention is not limited thereto.

For example, a transmission stop determination threshold value applied to frame data including the start ID is preferably looser (that is, larger in the allowable number of times that a transmission error is detected) than a transmission stop determination threshold value applied to other frame data.

It is because the data transmitting process (the process for storing data to be transmitted in the communication period in the transmitting buffer 222) by the motor ECU 2 does not start when frame data including a threshold value ID does not arrive at the motor ECU 2. In this case, the HV-ECU 1 undesirably misses all data that has to be received from the motor ECU 2 within the communication period regardless of whether or not the transmitting process is stopped in order to prioritize reception of data.

In the following, a second embodiment will be described in connection with an example in which the transmission stop determination threshold value applied to frame data including the start ID is different from that applied to other frame data. FIG. 13 is a diagram illustrating an example of a retransmission control process according to the second embodiment.

As illustrated in FIG. 13, when frame data having a transmission error is frame data including the start ID, the retransmission control unit 125c determines a timing of notifying the retransmission stop command (a timing for inhibiting the transmitting process or the retransmitting process) based on a transmission stop determination threshold value A.

For example, when the number of times that a transmission error of the frame data including the start ID is detected is larger than the transmission stop determination threshold value A, the retransmission control unit 125c notifies the communication unit 121 of the retransmission stop command. However, when the frame data having the transmission error is frame data other than the frame data including the start ID, the retransmission control unit 125c determines a timing of notifying the retransmission stop command based on a transmission stop determination threshold value B.

The transmission stop determination threshold value A is decided to have a value larger than the transmission stop determination threshold value B. For example, the retransmission control unit 125c decides a value obtained by dividing a time obtained by deducting T1 (a time necessary until all non-received data is received) from T2 (a remaining time of a predetermined communication period) by a detection time interval of a transmission error as the transmission stop determination threshold value A. Further, the retransmission control unit 125c decides a value obtained by dividing a value, obtained by multiplying a time obtained by deducting T1 from T2 by a predetermined coefficient α (0<α□<1), by a detection time interval of a transmission error as the transmission stop determination threshold value B.

In other words, when a transmission error occurs in frame data including the start ID, the retransmission control unit 125c secures a time necessary for reception of remaining data and continues the retransmitting process as long as possible. Thus, a possibility that frame data including the start ID will be transmitted to the motor ECU 2 can increase. In other words, a possibility that all data which has to be received from the motor ECU 2 within the communication period will be lost can be reduced as much as possible.

Further, when a transmission error occurs in frame data other than frame data including the start ID, the retransmission control unit 125c secures a time longer than a time necessary for reception of remaining data, and continues the retransmitting process (inhibits the retransmitting process at an early point in time). Thus, it is possible to prevent the occurrence of loss of data which has to be received within the communication period when transmission or reception of data is delayed due to a cause other than the retransmitting process.

As described above, in the second embodiment, when the number of times of detection or a duration time of a transmission error detected within one communication period is larger than the transmission stop determination threshold value, the retransmission control unit of the HV-ECU inhibits the retransmitting process in the corresponding communication period. Further, when data having a transmission error is data for instructing the motor ECU to start transmission, the retransmission control unit of the HV-ECU sets the transmission stop determination threshold value for determining inhibition of the retransmitting process to a value higher than that for other data.

Thus, even when a transmission error occurs, it is possible to prevent a situation in which data which has to be received in a predetermined communication period is not received. Further, when data having a transmission error is special data related to whether or not subsequent communication is to be continued, transmission is performed as long as possible, and thus communication can be continued as long as possible.

Particularly, when data having a transmission error is data (the start ID) for instructing a communication apparatus at the other side to start transmission, retransmission is inhibited in order to prioritize reception of other data, and thus a situation in which it is difficult to receive data can be prevented.

Further, the above description has been made in connection with the example in which a specific ID is the start ID, but the specific ID is not necessarily the start ID but may be any other ID. Further, the above description has been made in connection with the example in which the number of times that a transmission error is detected is compared with the transmission stop determination threshold value. However, the retransmission control unit 125c may compare a duration time of a transmission error with the transmission stop determination threshold value, similarly to the first embodiment.

In the above embodiments, in order to prevent loss of data that has to be received within the communication period, when the number of times of detection or a duration time of a transmission error detected within the communication period is larger than the transmission stop determination threshold value, it is determined that a problem is highly likely to occur in transmission of another data (particularly, transmission of data from another communication apparatus), and thus the retransmitting process is inhibited in the communication period during a predetermined time period.

However, when data transmission is temporarily stopped in order to prioritize transmission of another data, it is difficult to accurately perform an abnormality detecting process which has been conventionally performed, for example, an abnormality detecting process for determining whether it is temporal abnormality (when electrical noise is temporarily applied) or persistent abnormality, and thus appropriate countermeasures according to a communication status at that time may not be taken.

Specifically, let us assume that persistent communication abnormality is determined based on the number of times that a transmission error is detected. In this case, if it is not determined whether the reason why the transmitting process is not performed is because persistent abnormality occurs in a communication unit, a CAN bus, or the like and so transmission is not allowed or because a transmission error temporarily occurs due to electrical noise or the like and so transmission is inhibited when the transmitting process is temporarily stopped, persistent communication abnormality may not be accurately detected.

In this regard, in a third embodiment, a counter (hereinafter, referred to as "abnormality determining counter") for determining a persistent communication abnormal state (hereinafter, referred to as "abnormal status") is provided independently of a transmission stop determining counter for determining a temporal stop of the transmitting process. In the following, the third embodiment will be described in connection with this example.

Figure 14:
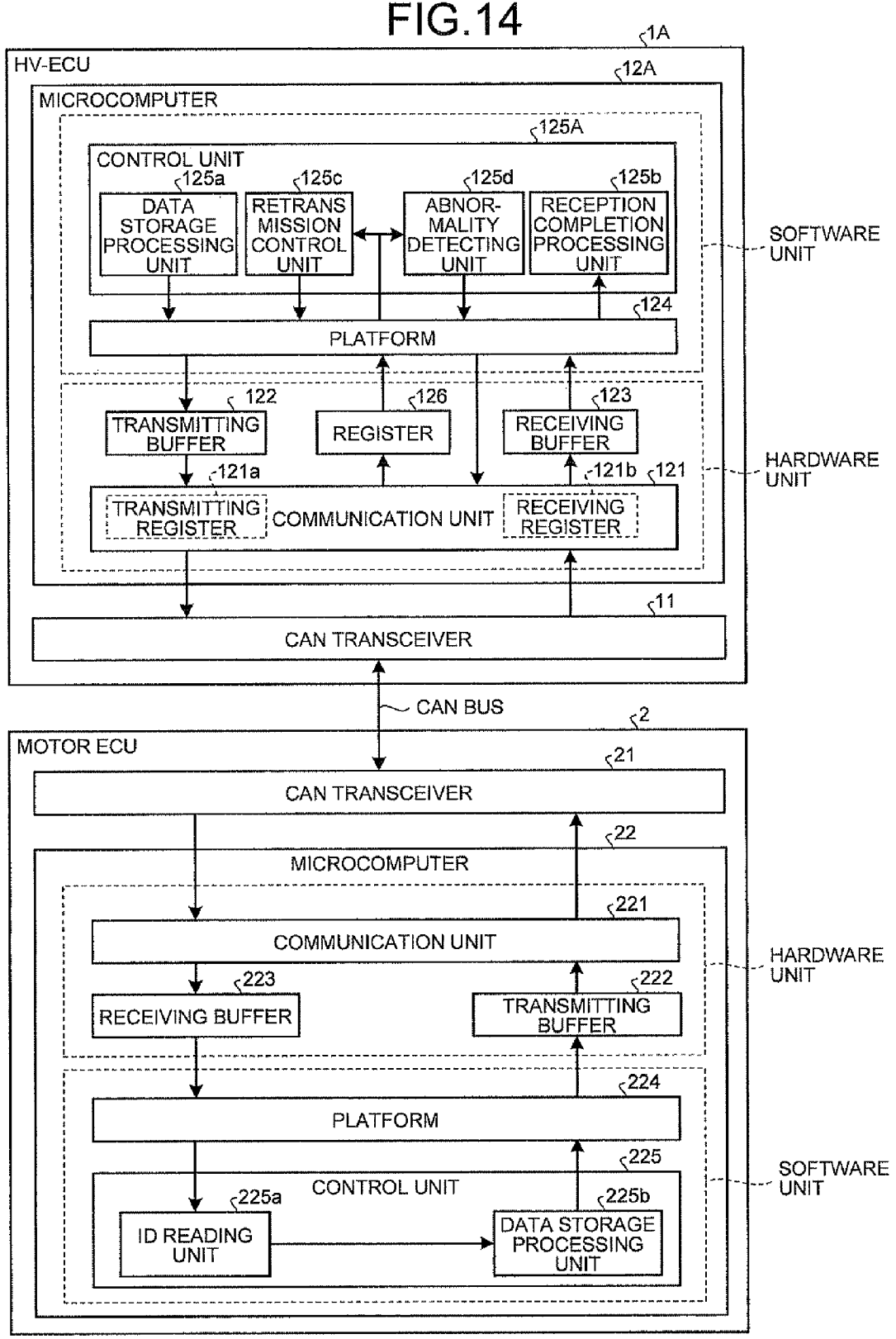
FIG. 14 is a block diagram illustrating configurations of a HV-ECU and a motor ECU according to a third embodiment.

First, configurations of a HV-ECU and a motor ECU according to the third embodiment will be described with reference to FIG. 14. FIG. 14 is a block diagram illustrating configurations of a HV-ECU and a motor ECU according to the third embodiment. In the following description, the same components as in the above description are denoted by the same reference numerals, and thus the redundant description will not be repeated.

As illustrated in FIG. 14, the control unit 125A of the HV-ECU 1A according to the third embodiment further includes an abnormality detecting unit 125d. The abnormality detecting unit 125d is a processing unit that stops subsequent data transmission when the number of times that a transmission error is detected over a plurality of communication periods is larger than an abnormality determination threshold value higher than the transmission stop determination threshold value.

Here, an operation of the abnormality detecting unit 125d will be described while comparing with an operation of the retransmission control unit 125c. FIG. 15 is a diagram illustrating an operation example of the retransmission control unit 125c and the abnormality detecting unit 125d (1 thereof).

As illustrated in FIG. 15, the retransmission control unit 125c counts up the count value of the transmission stop determining counter each time when a transmission error is detected. Then, when the number of times of detection or a duration time of a transmission error detected in the communication period is larger than the transmission stop determination threshold value (see step S21 of FIG. 15), the retransmission control unit 125c temporarily stops data transmission (including retransmission) from the communication unit 121 (see step S22 of FIG. 15).

Further, when the next communication period starts, the retransmission control unit 125c resets the count value of the transmission determining counter (see step S23 of FIG. 15). Thus, in the next communication period, the number of times that a transmission error is detected is counted starting from zero (0). A concrete operation of the retransmission control process is the same as in the first and second embodiments.

Meanwhile, the abnormality detecting unit 125d counts up a count value of the abnormality determining counter each time when a transmission error is detected, similarly to the retransmission control unit 125c. The count value of the abnormality determining counter is not reset even when the count value of the transmission stop determining counter is reset (see step S24 of FIG. 15).

Specifically, when data transmission from the communication unit 121 is temporarily stopped by the retransmission control unit 125c, the abnormality detecting unit 125d temporarily stops the counting process of the abnormality determining counter, and holds the count value of the abnormality determining counter.

Then, when the count value of the abnormality determining counter is larger than the abnormality determination threshold value (see step S25 of FIG. 15), the abnormality detecting unit 125d determines that communication abnormality has occurred, and inhibits data transmission (including retransmission) from the communication unit 121. The abnormality detecting unit 125d does not release inhibition of the transmitting process even when the communication period, in which the communication abnormality is detected and so the transmitting process is inhibited, ends and then the next communication period starts (see step S26 of FIG. 15).

Further, when the transmitting process is inhibited, the abnormality detecting unit 125d inhibits the retransmission control unit 125c from notifying the retransmission stop release command and performing an operation for setting the transmission stop flag of the register 126 to OFF. Thus, the transmission stop status is not released by the retransmission control unit 125c.

As described above, the transmission stop determining counter for determining temporal abnormality is provided independently of the abnormality determining counter for determining persistent abnormality, and the counting process of the abnormality determining counter is performed, in terms of a processing status of a transmission stopping/resuming process, based on the counting process of the transmission stop counter. Thus, it is possible to accurately determine whether detected abnormality is temporal abnormality (when electrical noise is temporarily applied) or persistent abnormality.

Separately from the transmission stop flag set to ON/OFF by the retransmission control unit 125c, a transmission stop flag (abnormality flag) set to ON/OFF by the abnormality detecting unit 125d may be set to the register 126. In this case, when the abnormality flag remains set to ON, even though the transmission stop flag is set to OFF by the retransmission control unit 125c, the data storage processing unit 125a stops storing data in the transmitting buffer 122.

Meanwhile, in FIG. 15, after abnormality is determined, subsequent transmission data is stopped. However, in this case, there occurs a problem in that communication is not performed even though a communication system is restored to normal by a certain cause (for example, when a repair is performed). For this reason, the transmitting process may be recovered each time when power of a device, for example, an IG-SW (ignition switch) mounted in a vehicle (not shown), is turned on or off.

In the following, an example in which the inhibition state of the transmitting process is released when the IG-SW is turned off will be described with reference to FIG. 16. FIG. 16 is a diagram illustrating an operation example of the retransmission control unit 125c and the abnormality detecting unit 125d (2 thereof).

As described above with reference to FIG. 15, when the count value of the abnormality determining counter is larger than the abnormality determination threshold value (see step S31 of FIG. 16), the retransmission control unit 125d determines that communication abnormality has occurred, and so inhibits data transmission (including retransmission) from the communication unit 121. The stat in which the transmitting process is inhibited is maintained even when the communication period in which the transmitting process is inhibited ends and then the next communication period starts (see step S32 of FIG. 16).

Here, when it is determined that abnormality has occurred, for example, a user is notified of the fact that abnormality has occurred, for example, by a warning lamp or the like. The user recognizes the fact that abnormality has occurred and requests a dealer to repair a vehicle. At this time, the IG-SW is turned off in order to carry out a repair (see step S33 of FIG. 16).

When the IG-SW is turned off, the abnormality detecting unit 125d releases inhibition of the transmitting process (see step S34 of FIG. 16), and resets the abnormality determining counter (see step S35 of FIG. 16). Further, the retransmission control unit 125c reset the count value of the transmission determining counter is reset when the communication period next to the communication period in which it is determined that abnormality has occurred starts (see step S36 of FIG. 16).

FIG. 16 has been described in connection with the example in which the inhibition state of the transmitting process is released when the IG-SW is turned off, but the present invention is not limited thereto. For example, the inhibition state of the transmitting process may be released when the IG-SW is turned on.

As described above, inhibition of the transmitting process is released at least when power is turned on or off, and thus the inhibition state of the transmitting process can be released at an appropriate timing.

Meanwhile, in FIGS. 15 and 16, the count value of the abnormality determining counter is counted up each time when a transmission error is detected. However, a timing at which the count value of the abnormality determining counter is counted up is not limited thereto. For example, the count value of the abnormality determining counter may be counted up each time when the retransmission control unit 125c temporarily stops data transmission.

Further, the abnormality detecting unit 125d may not only count up the count value of the abnormality determining counter but also count down the count value of the abnormality determining counter according to a predetermined condition. Here, a counting pattern of the abnormality determining counter will be described with reference to FIG. 17. FIG. 17 is a diagram illustrating an example of a counting pattern of the abnormality determining counter.

As illustrated in FIG. 17, the abnormality detecting unit 125d may count up the count value of the abnormality determining counter each time when a transmission error is detected, similarly to, for example, the retransmission control unit 125c (a pattern 1 of FIG. 17). In this case, the abnormality detecting unit 125d may count down the count value of the abnormality determining counter each when transmission of frame data is normally performed (a pattern 2 of FIG. 17).

Further, the abnormality detecting unit 125d may count up the count value of the abnormality determining counter in each communication period in which a transmission error is detected (a pattern 3 of FIG. 17). In this case, the abnormality detecting unit 125d may not perform a counting process from when a first transmission error is detected in a communication period to when the next communication period comes. That is, since the pattern 3 is smaller in frequency of the counting process than the patterns 1 and 2, the processing load can be reduced. Further, the abnormality detecting unit 125d may count down the count value of the abnormality determining counter when transmission error has not been detected in the communication period, (a pattern 4 of FIG. 17).

Further, when a transmission error has been detected but the transmission error has not been fixed within the communication period, the abnormality detecting unit 125d may count up the count value of the abnormality determining counter (a pattern 5 of FIG. 17). Thus, when transmission error has been detected and the transmission error has been fixed within the communication period, the count-up operation is not performed.

Further, the abnormality detecting unit 125d may count down the count value of the abnormality determining counter when a transmission error has not been detected within the communication period or when a transmission error has been detected and the transmission error has been fixed within the communication period (a pattern 6 of FIG. 17). Further, the abnormality detecting unit 125d may not count down the count value of the abnormality determining counter when a transmission error has been detected and the transmission error has been fixed within the communication period.

Further, as a pattern not illustrated in FIG. 17, the abnormality detecting unit 125d may detect a transmission error and the presence or absence of normal transmission of frame data at predetermined time intervals, count up the count value of the abnormality determining counter when normal transmission of frame data is not detected after a transmission error is previously detected, and count down the count value of the abnormality determining counter when a transmission error is not detected after normal transmission of frame data is previously detected. In this case, abnormality may be detected according to a duration time of an abnormal state based on a transmission error and a duration time of a normal state based on normal transmission of frame data.

Further, the count-up condition and the count-down condition described above are not limited to a combination specified in each pattern and may be based on a combination of a count-up condition and a count-down condition which are not specified in the above described patterns.

Further, the count-up operation is performed at an abnormal time, and the count-down operation is performed at a normal time, but the count-up operation may be performed at a normal time, and the count-down operation may be performed at an abnormal time. Further, a counter for counting an abnormal state and a counter for counting a normal state may be provided independently of each other. In this case, for example, the counter for counting an abnormal state may be configured to be reset when the counter for counting a normal state is larger than a predetermined threshold value.

Here, the pattern 2 of FIG. 17 will be described with reference to FIG. 18. FIG. 18 is a diagram illustrating an operation example of the retransmission control unit and the abnormality detecting unit (3 thereof). Here, FIG. 18 illustrates an example in which a transmission state is restored to normal before the count value of the abnormality determining counter is larger than the abnormality determination threshold value (see step S41 of FIG. 18).

As illustrated in FIG. 18, the abnormality detecting unit 125d counts down the count value of the abnormality determining counter by one each time when data transmission is normally completed (see step S42 of FIG. 18). Then, when the count value of the abnormality determining counter becomes zero (0), the abnormality detecting unit 125d maintains the count value "0" (see step S43 of FIG. 18).

As described above, the count value of the abnormality determining counter is counted down according to a predetermined condition, and thus it is prevented to erroneously determine that it is an abnormal state (a persistent abnormal state) because detection of a temporal transmission error is accumulated for a long time.

Further, the abnormality detecting unit 125d may count up the count value of the abnormality determining counter each time when the retransmission control unit 125c temporarily stops data transmission. In this case, when data transmission has not been temporarily stopped in the communication period, the abnormality detecting unit 125d may count down the count value of the abnormality determining counter.

Next, a processing procedure of a transmitting process according to the third embodiment will be described with reference to FIG. 19. FIG. 19 is a flowchart illustrating the processing procedure of the transmitting process according to the third embodiment.

As illustrated in FIG. 19, the retransmission control unit 125c determines whether or not the abnormality flag remains set to OFF (step S301). When it is determined that the abnormality flag remains set to OFF (Yes in step S301), the retransmission control unit 125c determines whether or not it is a start timing of a communication processing period (step S302).

When it is determined in step S302 that it is the start timing of the communication processing period (Yes in step S302), the retransmission control unit 125c determines whether or not it is a start timing of a communication period (step S303).

When it is determined in this processing that it is the start timing of the communication period (Yes in step S303), the retransmission control unit 125c sets the transmission stop flag to OFF (step S304) and then resets the transmission stop determining counter (step S305).

When processing of step S305 is completed or when it is determined in step S303 that it is not the start timing of the communication period (No in step S303), the data storage processing unit 125a determines whether or not the transmission stop flag remains set to OFF (step S306).

When it is determined in this processing that the transmission stop flag remains set to OFF (Yes in step S306), the data storage processing unit 125a extracts transmission data (step S307), and sets the extracted transmission data to the transmitting buffer 122 (step S308).

When the process of step S308 is completed, when it is determined in step S306 that the transmission stop flag does not remain set to OFF (No in step S306), or when it is determined in step S302 that it is not the start timing of the communication processing period (No in step S302), the retransmission control unit 125c determines whether or not a transmission error has been detected (step S309). Specifically, when the transmission error flag of the register 126 remains set to ON, the retransmission control unit 125c determines that a transmission error has been detected.

When it is determined in this processing that a transmission error has been detected (Yes in step S309), the retransmission control unit 125c causes the transmission stop determining counter to count up (step S310). Then, the retransmission control unit 125c determines whether or not the transmission stop flag remains set to OFF (step S311). When it is determined that the transmission stop flag remains set to OFF (Yes in step S311), the retransmission control unit 125c determines whether or not a threshold value has been decided (step S312). Here, when it is determined that the threshold value has not been decided (No in step S312), the threshold value deciding process is performed to decide the threshold value (step S313).

Meanwhile, when the process of step S313 is completed or when it is determined in step S312 that the threshold value has been decided (Yes in step S312), the retransmission control unit 125c determines whether or not the count value of the transmission determining counter is larger than the transmission stop determination threshold value (step S314).

When the count value of the transmission determining counter is larger than the transmission stop determination threshold value (Yes in step S314), the retransmission control unit 125c deletes all non-transmitted data stored in the transmitting buffer 122 (step S315), sets the transmission stop flag of the register 126 to ON (step S316), and then ends the process.

Meanwhile, when it is determined in step S301 that the abnormality flag does not remain set to OFF (No in step S301), when it is determined in step S309 that a transmission error has not been detected (No in step S309), when it is determined in step S311 that the transmission stop flag does not remain set to OFF (No in step S311), or when it is determined in step S314 that the count value of the transmission determining counter is not larger than the transmission stop determination threshold value (No in step S314), the retransmission control unit 125c ends the process.

Figure 20:
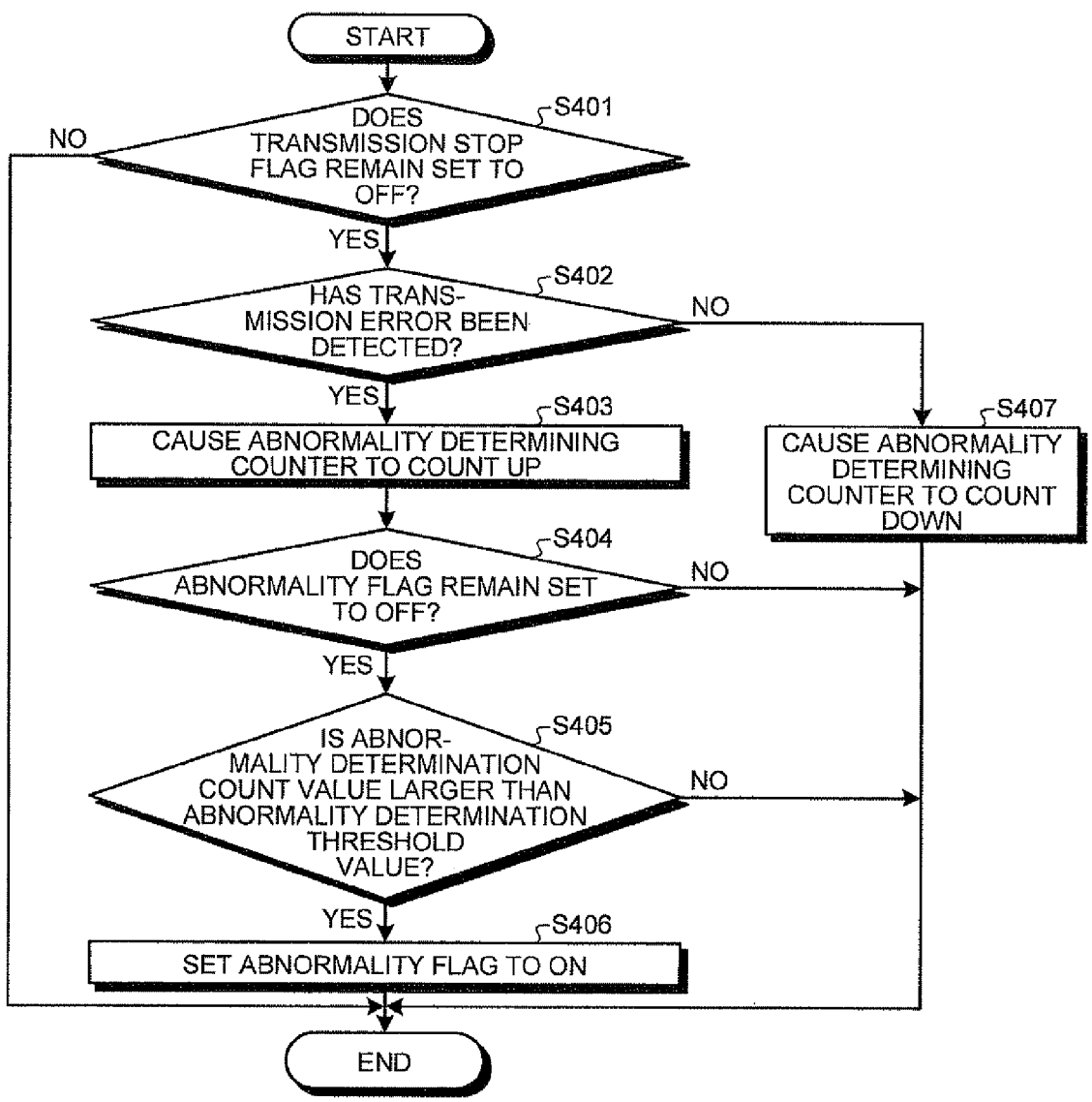
FIG. 20 is a flowchart illustrating a processing procedure of an abnormality determining process (1 thereof)

Next, a processing procedure related to an abnormality determining process will be described with reference to FIG. 20. FIG. 20 is a flowchart illustrating the processing procedure of the abnormality determining process (1 thereof). The abnormality detecting unit 125d performs a processing procedure illustrated in FIG. 20 in parallel with the processing procedure illustrated in FIG. 19.

As illustrated in FIG. 20, the abnormality detecting unit 125d determines whether or not the transmission stop flag remains set to OFF (step S401). When it is determined that the transmission stop flag remains set to OFF (Yes in step S401), the abnormality detecting unit 125d determines whether or not a transmission error has been detected (step S402).

When it is determined in step S402 that a transmission error has been detected (Yes in step S402), the abnormality detecting unit 125d causes the abnormality determining counter to count up (step S403). Then, the abnormality detecting unit 125d determines whether or not the abnormality flag remains set to OFF (step S404). When it is determined that the abnormality flag remains set to OFF (Yes in step S404), the abnormality detecting unit 125d determines whether or not the count value of the abnormality determining counter is larger than the abnormality determination threshold value (step S405).

When it is determined in step S405 that the count value of the abnormality determining counter is larger than the abnormality determination threshold value (Yes in step S405), the abnormality flag is set to ON (step S406), and then the process ends.

However, when it is determined in step S402 that a transmission error has not been detected (No in step S402), the abnormality detecting unit 125d causes the abnormality determining counter to count down (step S407), and then the process ends.

Further, when it is determined in step S401 that the transmission stop flag does not remain set to OFF (No in step S401), when it is determined in step S404 that the abnormality flag does not remain set to ON (No in step S404), or when it is determined in step S405 that the abnormality determination count value is not larger than the abnormality determination threshold value (No in step S405), the abnormality detecting unit 125d ends the process.

Figure 21:
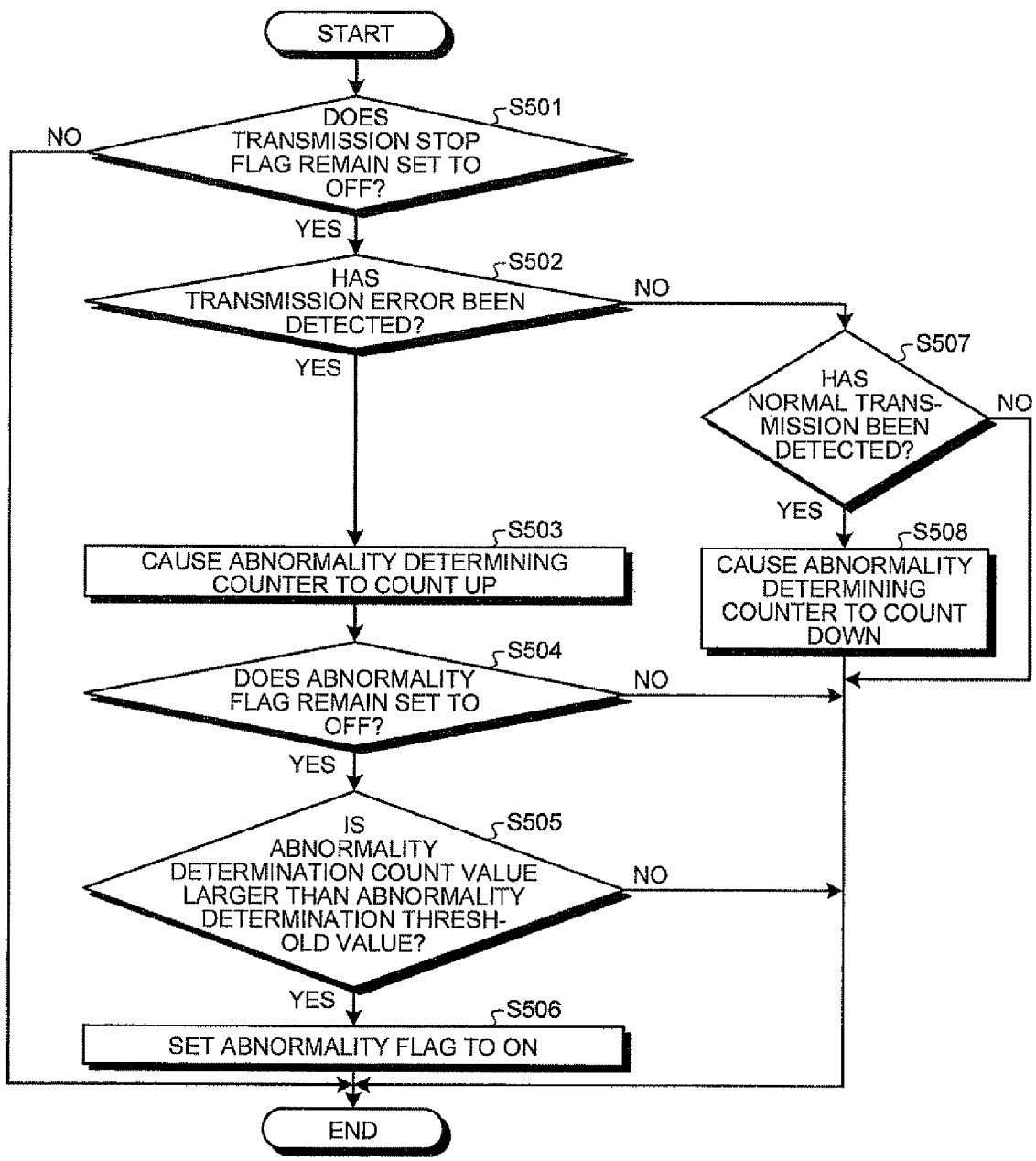
FIG. 21 is a flowchart illustrating a processing procedure of an abnormality determining process (2 thereof).

Another example of the processing procedure of the abnormality determining process will be described with reference to FIG. 21. FIG. 21 is a flowchart illustrating the processing procedure of the abnormality determining process (2 thereof). FIG. 21 is different from FIG. 20 in that when the count value of the abnormality determining counter is counted down, it is determined whether or not data has been normally transmitted. The processes of steps S501 to S506 of FIG. 21 are the same as the processes of steps S401 to S406 of FIG. 20, and a description thereof will not be made.

As illustrated in FIG. 21, when it is determined in step S502 that a transmission error has not been detected (No in step S502), the abnormality detecting unit 125d determines whether normal transmission of data has been detected (step S507). When it is determined that normal transmission has been detected (Yes in step S507), the abnormality detecting unit 125d causes the abnormality determining counter to count down (step S508), and then ends the process. However, when it is determined that normal transmission has not been detected (No in step S507), the abnormality detecting unit 125d ends the process "as is".

As described above, in the third embodiment, when the number of times of detection or a duration time of a transmission error detected within one communication period is larger than the transmission stop determination threshold value, the retransmission control unit 125c inhibits the transmitting process in the corresponding communication period. Further, the abnormality detecting unit 125d detects the number of times of detection or a duration time of a transmission error detected over a plurality of communication periods during a time period other than a time period in which the transmitting process is inhibited by the retransmission control unit 125c. Then, it is determined that communication abnormality has occurred when the detected number of times of detection or the detected duration time is larger than the abnormality determination threshold value higher than the transmission stop determination threshold value. Thus, communication abnormality can be reliably determined.

In the above embodiments, in order to increase efficiency of data communication, the HV-ECUs 1 and 1A transmit frame data including the start ID, the motor ECU 2 receives the frame data including the start ID, and then transmission of data corresponding to the start ID is performed. However, this transmitting/receiving process needs not be necessarily performed. In other words, the communication system according to the above embodiments may be any other communication system to the extent that the first communication apparatus and the second communication apparatus perform transmission and reception of data with a predetermined communication period.

The above embodiments have been described in connection with the example in which the transmission stop determination threshold value is dynamically decided by the threshold value deciding process. However, the retransmission control unit 125c may use a previously decided transmission stop determination threshold value without performing the threshold value deciding process.

Further, the above embodiments have been described in connection with the example in which a priority order of data from the HV-ECUs 1 and 1A which are the master nodes is set to be higher than a priority order of data from the motor ECU 2 which is the slave node. However, the present invention is not limited thereto.

Furthermore, in the above embodiments, the HV-ECUs 1 and 1A and the motor ECU 2 perform communication according to the CAN protocol. However, the HV-ECUs 1 and 1A and the motor ECU 2 may perform communication according to any other communication protocol through which the same communication mediation is performed as in the CAN protocol. In addition, the HV-ECUs 1 and 1A and the motor ECU 2 perform communication via the CAN bus, but any other communication line similar to the CAN bus may be used.

As described above, a communication apparatus and a communication system according to the present disclosure are effective in preventing loss of data which has to be received in a predetermined communication period even though a transmission error occurred and may be applied, particularly, to a vehicle network in which in-vehicle ECUs are connected to each other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus in a communication system in which a plurality of communication apparatuses repeatedly perform transmission and reception of data every predetermined communication period repeated at regular intervals, and communication in the communication system is performed by a communication scheme in which simultaneous transmission from a plurality of devices is not allowed, the communication apparatus comprising:

a retransmitting unit configured to perform a retransmitting process of data when a transmission error of the data is detected;

a retransmission control unit configured to inhibit the retransmitting process in a corresponding communication period if a number of times of detection or a duration time of a transmission error detected within one period of the communication period is larger than a first threshold value, and to release an inhibition of the retransmitting process when the corresponding communication period ends and a next communication period begins; and an abnormality detecting unit configured to detect the number of times of detection or a duration time of a transmission error detected over a series of communication periods during a time period other than a time period in which the retransmitting process is inhibited by the retransmission control unit, to determine that communication abnormality has occurred when the detected number of times of detection or the detected duration time is larger than a second threshold value which is higher than the first threshold value, to inhibit the retransmitting process when abnormality is detected, and to not release inhibition of the retransmitting process even when a communication period in which the transmission is inhibited ends and the next communication period begins.

2. The communication apparatus according to claim 1, wherein the communication apparatus is installed in a control device that needs to receive a predetermined amount of data within one period of the communication period as data used for a predetermined calculation process performed with a predetermined control period.

3. The communication apparatus according to claim 1, wherein when transmitting processes of a plurality of communication apparatuses are evoked at the same time, a transmitting process of the communication apparatus is prioritized over the transmitting processes of the other communication apparatuses.

4. The communication apparatus according to claim 1, wherein the abnormality detecting unit releases inhibition of the transmitting process at least when power is turned on or off.

5. The communication apparatus according to claim 1, wherein the retransmission control unit decides the first threshold value, based on a time necessary until all remaining data that needs to be received in the predetermined communication period are received and a remaining time of the predetermined communication period, when the transmission error of the data is detected.

6. The communication apparatus according to claim 1, wherein when reception of data that needs to be received in the predetermined communication period is not completed, data received in a communication period prior to the predetermined communication period is dealt as data received in the predetermined communication period.

7. The communication apparatus according to claim 1, further comprising
a control unit configured to collectively store all data that need to be transmitted within the predetermined communication period in a transmitting buffer when data stored in a receiving buffer is data representing a start of the communication period.

8. The communication apparatus according to claim 1, wherein the retransmission control unit sets the first threshold value for inhibiting the retransmitting process to be higher than a case of other data when the data having the transmission error is data for instructing a second communication apparatus to start transmission.

9. The communication apparatus according to claim 8, wherein the communication apparatus is installed in a control device that needs to receive a predetermined amount of data within one period of the communication period as data used for a predetermined calculation process performed with a predetermined control period.

10. The communication apparatus according to claim 8, wherein when transmitting processes of a plurality of communication apparatuses are evoked at the same time, a transmitting process of the communication apparatus is prioritized over the transmitting processes of the other communication apparatuses.

11. The communication apparatus according to claim 8, wherein the retransmission control unit decides the first threshold value, based on a time necessary until all remaining data that needs to be received in the predetermined communication period are received and a remaining time of the predetermined communication period, when the transmission error of the data is detected.

12. The communication apparatus according to claim 8, wherein when reception of data that needs to be received in the predetermined communication period is not completed, data received in a communication period prior to the predetermined communication period is dealt as data received in the predetermined communication period.

13. The communication apparatus according to claim 1, wherein the retransmission control unit decides the first threshold value, based on a time necessary until all remaining data that needs to be received in the predetermined communication period are received and a remaining time of the predetermined communication period, when the transmission error of the data is detected.

14. A communication system in which a first communication apparatus and a second communication apparatus repeatedly perform transmission and reception of data every predetermined communication period repeated at regular intervals, and communication between the first communication apparatus and the second communication apparatus is performed by a communication scheme in which simultaneous transmission from the first communication apparatus and the second communication apparatus is not allowed, the communication system comprising:
the first communication apparatus including
a retransmitting unit configured to perform a retransmitting process of data when a transmission error of the data is detected,
a retransmission control unit configured to inhibit the retransmitting process in a corresponding communication period if the number of times of detection or a duration time of a transmission error detected within one period of the communication period is larger than a first threshold value, and to release an inhibition of the retransmitting process when the corresponding communication period ends and a next communication period begins; and
an abnormality detecting unit configured to detect the number of times of detection or a duration time of a transmission error detected over a series of communication periods during a time period other than a time period in which the retransmitting process is inhibited by the retransmission control unit, to determine that communication abnormality has occurred when the detected number of times of detection or the detected duration time is larger than a second threshold value which is higher than the first threshold value, to inhibit the retransmitting process when abnormality is detected, and to not release inhibition of the retransmitting process even when a communication period in which the transmission is inhibited ends and the next communication period begins.

15. The communication apparatus according to claim 1, wherein the retransmission control unit comprises a first counter configured to start to count the number of times of retransmission in the retransmitting process when each of the series of communication periods begins, and to be reset when each of the series of communication periods ends,
the abnormality detecting unit comprises a second counter configured to start to count the number of times of retransmission when the earliest communication period of the series of communication periods begins, to count the number of times of retransmission over the series of communication periods, and not to be reset even when each of the series of communication periods ends, the retransmission control unit inhibits the retransmitting process in the corresponding communication period in which the number of times of retransmission counted by the first counter is larger than a third threshold value, and
the abnormality detecting unit inhibits the retransmitting process when the number of times of retransmission counted by the second counter is larger than a fourth threshold value which is higher than the third threshold value.

\* \* \* \* \*